(12) United States Patent
Lane

(10) Patent No.: US 7,976,045 B2
(45) Date of Patent: Jul. 12, 2011

(54) BICYCLE FRONT FORK ASSEMBLY

(75) Inventor: Timothy Saul Lane, Irvine, CA (US)

(73) Assignee: Felt Racing, LLC, Irvine, CA (US)

( * ) Notice: Subject to any disclaimer, the term of this patent is extended or adjusted under 35 U.S.C. 154(b) by 191 days.

(21) Appl. No.: 12/510,071

(22) Filed: Jul. 27, 2009

(65) Prior Publication Data

US 2009/0283985 A1    Nov. 19, 2009

Related U.S. Application Data

(63) Continuation-in-part of application No. 11/595,205, filed on Nov. 10, 2006, now Pat. No. 7,571,920.

(60) Provisional application No. 60/826,516, filed on Sep. 21, 2006.

(51) Int. Cl.
*B62K 21/02* (2006.01)

(52) U.S. Cl. .............. 280/279; 280/276; 280/280

(58) Field of Classification Search .......... 280/275–280; 180/219; 74/551.3, 551.8, 551.1; 29/700
See application file for complete search history.

(56) References Cited

U.S. PATENT DOCUMENTS

| | | | |
|---|---|---|---|
| 371,266 A | 10/1887 | Knous | |
| 400,074 A | 3/1889 | Gendron | |
| 2,687,898 A | 8/1954 | Schwinn | |
| 2,756,070 A | 7/1956 | Torre | |
| 3,785,676 A * | 1/1974 | Klein, Jr. ................ | 280/279 |
| 4,008,903 A | 2/1977 | Ramond | |
| 4,189,167 A | 2/1980 | Dubois | |
| 4,854,844 A | 8/1989 | Carlsen | |
| 4,939,950 A | 7/1990 | Girvin | |
| 5,039,470 A | 8/1991 | Bezin | |
| 5,044,656 A | 9/1991 | Peyre | |
| 5,065,633 A | 11/1991 | Mercat | |
| 5,085,063 A | 2/1992 | Van Dyke et al. | |
| 5,181,732 A | 1/1993 | Bezin | |
| 5,188,384 A | 2/1993 | van Raemdonck | |
| 5,190,308 A | 3/1993 | Couturet et al. | |
| 5,271,784 A | 12/1993 | Chen et al. | |
| 5,429,381 A * | 7/1995 | Mercat et al. ............... | 280/279 |
| 5,540,457 A | 7/1996 | Johnson | |
| 5,826,898 A | 10/1998 | Fortier et al. | |
| 6,234,506 B1 | 5/2001 | Li | |

(Continued)

FOREIGN PATENT DOCUMENTS

DE           9415070           11/1994

(Continued)

*Primary Examiner* — Paul N Dickson
*Assistant Examiner* — Tashiana Adams
(74) *Attorney, Agent, or Firm* — Stentina Brunda Garred & Brucker

(57) ABSTRACT

A bicycle front end assembly is provided which is configured to reduce aerodynamic drag. In particular, an axis shaft of a fork may be mounted to a head tube of a bicycle frame. A fork head may be disposed in front of the head tube for providing a front end assembly which is aerodynamically configured while providing an increased moment of inertia compared with traditional designs to reduce drag of the bicycle and increase steering stiffness. Also, the handlebar may be attached to the fork head such that when the bicycle is steered to the left, the fork head is rotated toward the left and when the bicycle is steered to the right, the fork head is rotated toward the right. In this manner, the fork head is alignable to the travel direction of the bicycle.

6 Claims, 14 Drawing Sheets

U.S. PATENT DOCUMENTS

| | | |
|---|---|---|
| 6,254,115 B1 | 7/2001 | Lin |
| 6,669,219 B2 | 12/2003 | Turner et al. |
| 6,711,966 B2 | 3/2004 | Chuang |
| 6,805,373 B2 | 10/2004 | Singenberger et al. |
| 6,889,992 B2 | 5/2005 | Vroomen et al. |
| 7,000,936 B2 | 2/2006 | Schmider |
| 7,104,562 B2 | 9/2006 | Schmider et al. |
| 7,237,787 B2 * | 7/2007 | Gueugneaud ................ 280/279 |
| 7,396,032 B2 * | 7/2008 | Horiuchi ....................... 280/279 |
| 7,438,306 B2 * | 10/2008 | Mrdeza et al. ............... 280/279 |
| 2002/0033586 A1 | 3/2002 | Vroomen et al. |
| 2005/0109152 A1 | 5/2005 | Hsu |
| 2008/0035431 A1 | 2/2008 | Vroomen et al. |
| 2008/0036170 A1 | 2/2008 | Vroomen et al. |
| 2008/0036171 A1 | 2/2008 | Vroomen et al. |
| 2008/0054592 A1 | 3/2008 | Vroomen et al. |
| 2008/0054593 A1 | 3/2008 | Vroomen et al. |
| 2008/0073870 A1 | 3/2008 | Lane |
| 2010/0213684 A1 * | 8/2010 | D'Aluisio ..................... 280/279 |

FOREIGN PATENT DOCUMENTS

| | | |
|---|---|---|
| DE | 4423116 | 2/1995 |
| DE | 20206195 | 8/2002 |
| DE | 20206196 | 9/2002 |
| EP | 1612134 | 1/2006 |
| WO | 9525034 | 9/1995 |

* cited by examiner

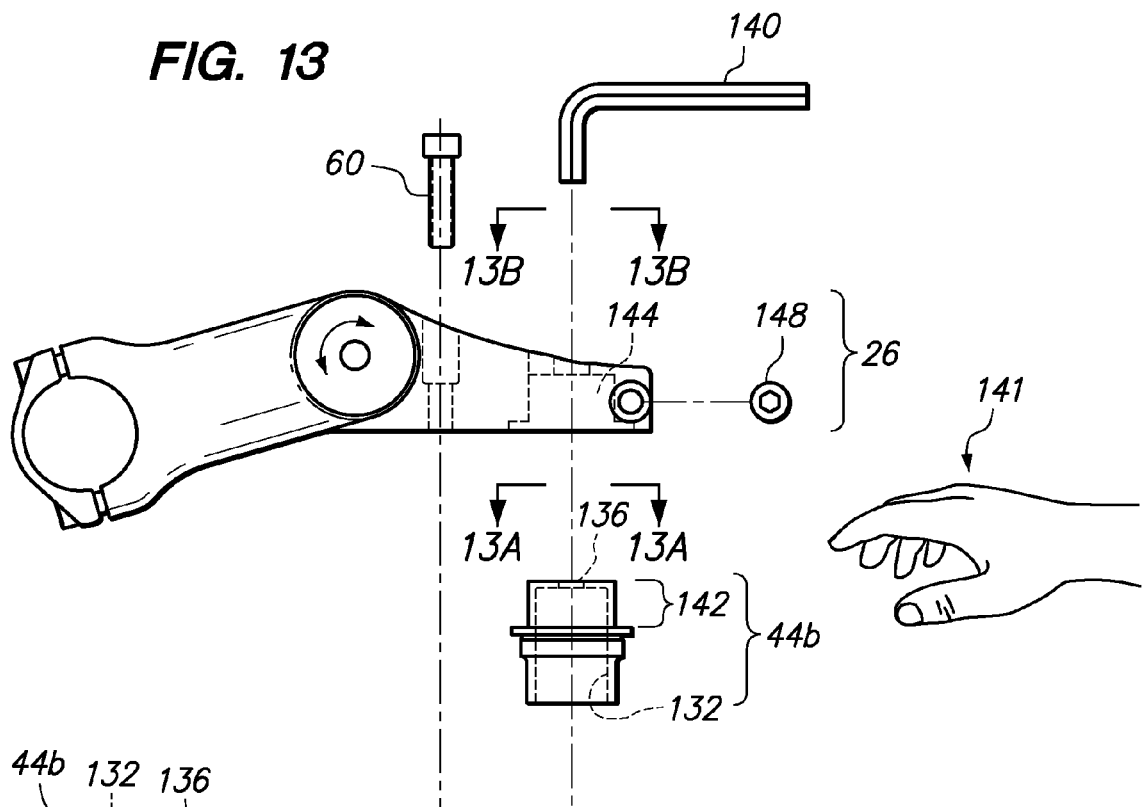
FIG. 13
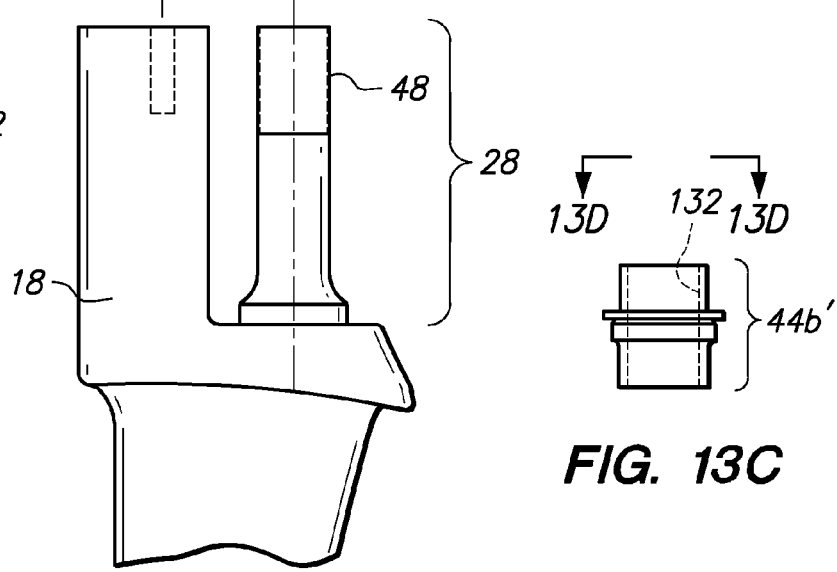
FIG. 13A
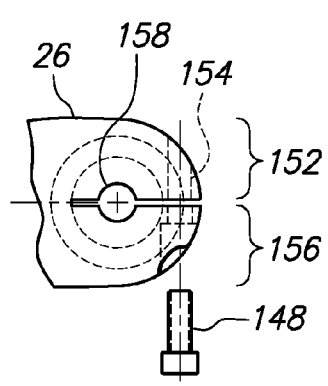
FIG. 13B
FIG. 13C
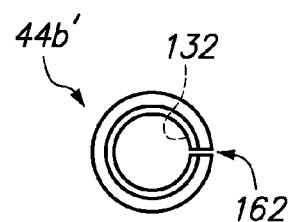
FIG. 13D

BICYCLE FRONT FORK ASSEMBLY

CROSS-REFERENCE TO RELATED APPLICATIONS

This is a continuation in part application of U.S. patent application Ser. No. 11/595,205 filed on Nov. 10, 2006 now U.S. Pat. No. 7,571,920, which claims the benefit of U.S. Provisional Patent Application No. 60/826,516, filed on Sep. 21, 2006, the entire contents of which are both incorporated herein by reference.

STATEMENT RE: FEDERALLY SPONSORED RESEARCH/DEVELOPMENT

Not Applicable

BACKGROUND

The present invention is related to a bicycle front end assembly, and more particularly, to an aerodynamically shaped front end of the bicycle.

In prior art bicycles, the fork and handlebar are attached to a head tube of the bicycle frame via a threaded headset (see FIG. 1) or a non-threaded headset (see FIG. 2). In relation to threaded headsets, the fork may comprise a steerer shaft which protrudes upwardly from a fork crown which joins fork legs. The steerer shaft is sized and configured to be received within the head tube of the frame. A lower bearing is interposed between the lower end portion of the head tube and the fork crown. Also, an upper bearing is interposed between the upper end portion of the head tube and an upper cone or cup which is attached to the upper end portion of the head tube. The upper and lower bearings allow the fork to pivot about the head tube of the bicycle frame.

The handlebar stem is inserted into the steerer shaft. The handlebar stem has a lower quill that frictionally engages the wedge. The handlebar stem and the steerer shaft are engaged to each other via a compression bolt. The compression bolt is insertable through the handlebar stem and threadably engagable to an internal thread of the quill. The compression bolt expands the quill and wedge to fixedly attach the handlebar stem and fork. After the handlebar stem is attached to the steerer shaft, the handlebar is attached to the handlebar stem.

In a threadless system, the steerer shaft is sufficiently long so as to protrude through the upper end of the head tube. The lower bearing is disposed between the fork crown and the lower end portion of the head tube. The upper bearing is disposed between upper end portion of the head tube carrying an upper cone or cup. The handlebar stem is directly attached to the upper end portion of the steerer shaft. The handlebar is then attached to the steerer shaft.

As you will note in the prior art, the handlebar/handlebar stem is always directly attached to or is supported by the steerer shaft which extends through the head tube of the bicycle frame. Such configuration is not optimal in the structural and aerodynamic sense because the load bearing steerer shaft must be sized smaller than the bore through the frame such that it can rotate freely.

The frontal area of a bicycle contributes to the amount of aerodynamic drag that a cyclist experiences. The bicycle front end is the initial part of the bicycle/rider unit that slices through the air. On one hand, if the bicycle front end slices through the air efficiently, then the amount of drag that the cyclist would have to overcome is reduced. On the other hand, if the bicycle front end slices through the air inefficiently, then the amount of drag that the cyclist would have to overcome is increased.

In bicycle sport racing, it is advantageous to reduce the amount of drag because less drag equates to a faster race time. The front end assembly of prior art bicycles is prone to drag due to the discontinuous shape thereof and the fact that the frame's head tube must be necessarily have a larger frontal area than is required to fit the fork steerer shaft, which bears the steering loads, into the head tube. Preferably, the steerer shaft is very stiff in torsion and bending. This can be achieved by increasing the moment of inertia of said steerer shaft. Accordingly, there is a need in the art for a more aerodynamically shaped bicycle front end assembly.

BRIEF SUMMARY

The present invention addresses the deficiencies identified above, discussed below and those that are known in the art.

The bicycle front end may comprise a fork. The fork may have fork legs which are attached to a front wheel. The fork legs may be joined to each other at a fork crown. An axis shaft and a fork head may be attached to the fork crown. The axis shaft defines a fork rotational axis. The fork head is disposed in front of a head tube of the bicycle frame when the fork is mounted to the bicycle frame. When the fork is rotated to maneuver the bicycle, the fork head is also rotated toward the travel direction of the bicycle. In this regard, the fork head assists in reducing drag despite the travel direction of the bicycle.

The axis shaft may be used to mount the fork to the head tube of the bicycle frame, whereas, the fork head may be used to mount the handlebar for steering the bicycle. In particular, a lower bearing may be disposed between the fork crown and the lower end portion of the head tube when the axis shaft is inserted into the head tube. An upper bearing may be disposed between the upper end portion of the head tube and a headset cap. The headset cap may be threaded onto external threads formed on the upper distal end portion of the axis shaft. The headset cap may be tightened onto the axis shaft to compress the headset cap, head tube, upper and lower bearings, and fork together until a fork rotational axis is aligned to a central axis of the head tube, the fork does not wobble and is able to freely rotate with respect to the head tube of the bicycle frame. After the headset cap is tightened onto the axis shaft, the headset cap is fixed to the axis shaft via a headset locking screw, pin, attachment to a handlebar mount or other method.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 10A is a top view of the headset cap shown in FIG. 10;

FIG. 10B is a top view of the handlebar mount shown in FIG. 10;

FIG. 10C is a front view of an alternate embodiment of the headset cap shown in FIG. 10;

FIG. 11A is a top view of the handlebar mount shown in FIG. 11;

FIG. 11B is a front view of an alternate embodiment of the headset cap shown in FIG. 11;

FIG. 12A is a top view of the handlebar mount shown in FIG. 12;

FIG. 12B is a front view of an alternate embodiment of the headset cap shown in FIG. 12;

FIG. 13 is a further embodiment for locking a headset cap onto the axis shaft;

FIG. 13A is a top view of the headset cap shown in FIG. 13;

FIG. 13B is a top view of the handlebar mount shown in FIG. 13;

FIG. 13C is a front view of an alternate embodiment of the headset cap shown in FIG. 13; and FIG. 13D is a top view of the headset cap shown in FIG. 13C.

DETAILED DESCRIPTION

Figure 1:
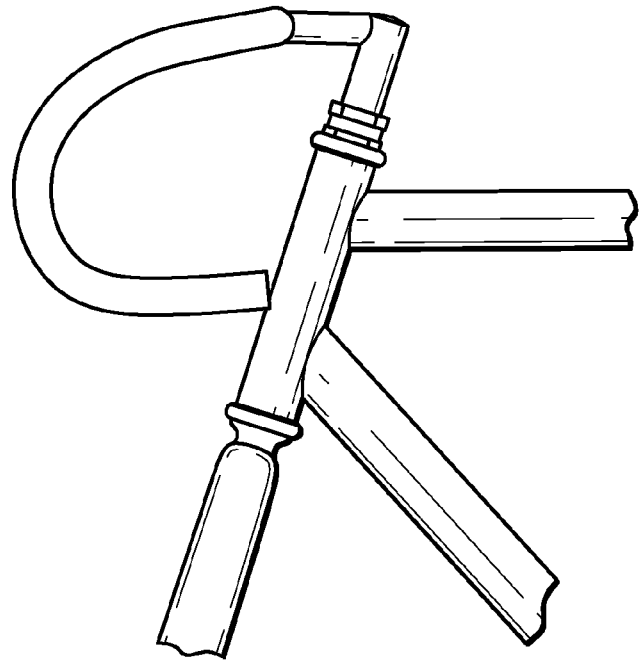
FIG. 1 is a side view of a prior art threaded headset of a bicycle wherein a handlebar is directly mounted to a steerer shaft of a fork.
Figure 2:
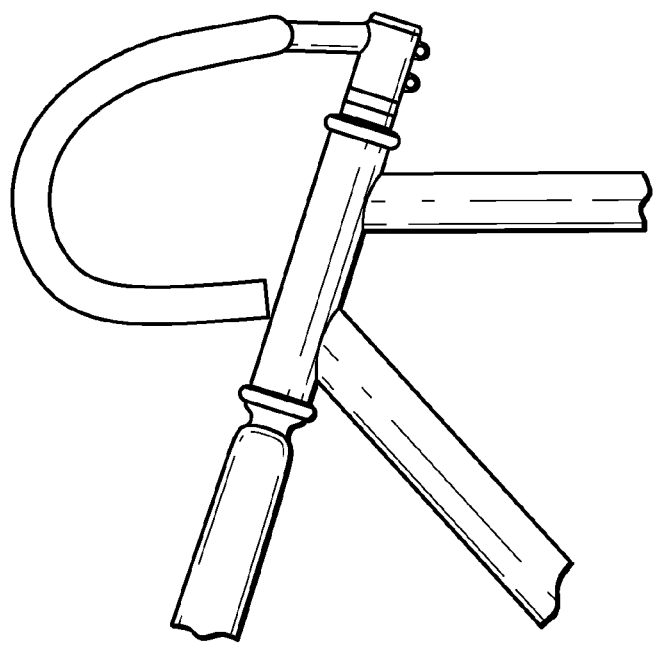
FIG. 2 is a side view of a prior art threadless headset of a bicycle wherein the handlebar is also directly mounted to the steerer shaft of the fork.
Figure 3:
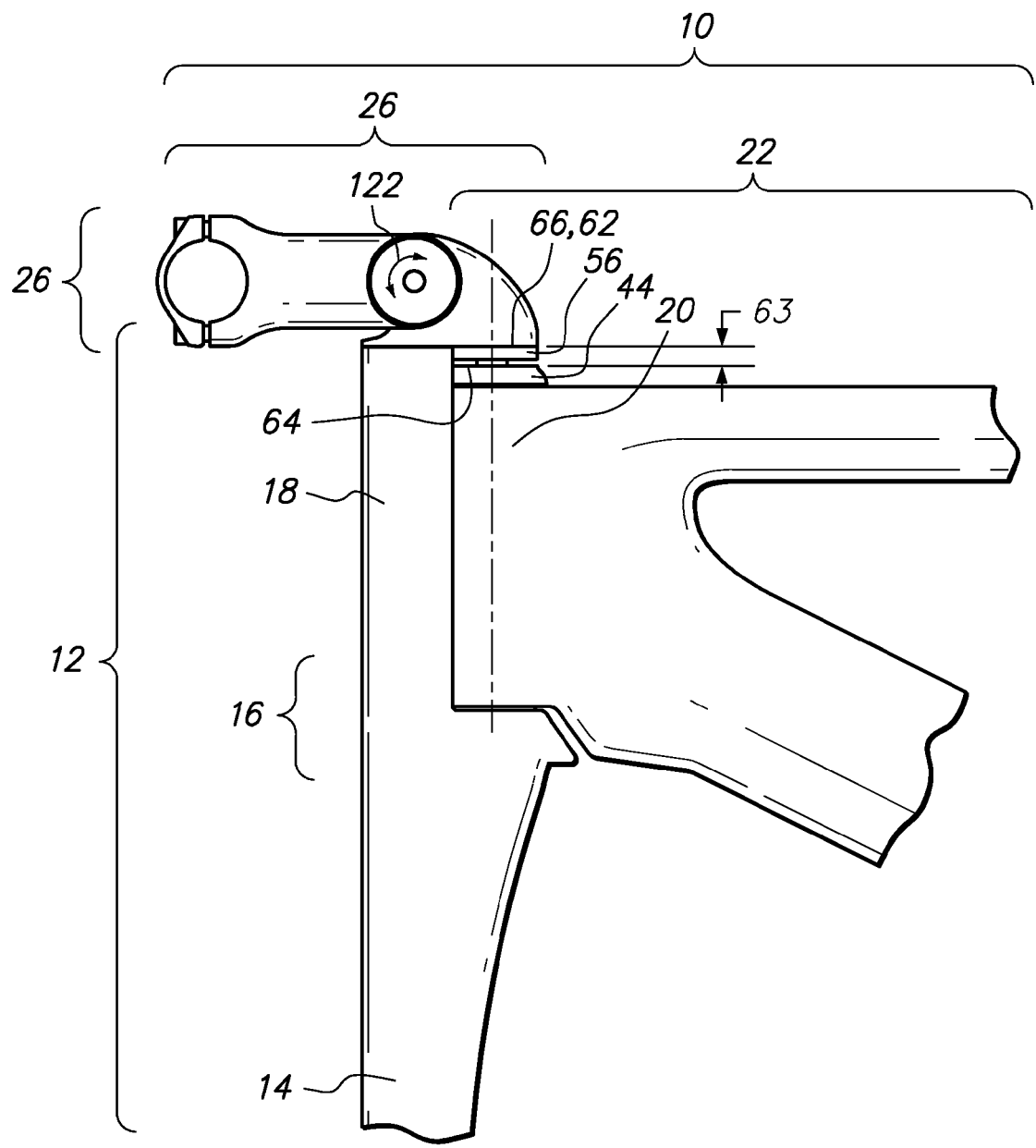
FIG. 3 is an assembled side view of a bicycle wherein an axis shaft of the fork is mounted to a head tube of a bicycle frame and a handlebar is separably mounted to a fork head attached to the fork.

Referring now to FIG. 3, a side assembled view of a bicycle 10 is shown. The bicycle 10 is shown as having a fork 12. The fork 12 has fork legs 14 which extend upward and are joined together at a fork crown 16. A fork head 18 is extended upward in front of a head tube 20 of a bicycle frame 22 for providing an aerodynamically configured bicycle front end compared to prior art threaded headsets (see FIG. 1) and prior art threadless headsets (see FIG. 2). Additionally, the fork head 18 also is a structural support for a handlebar. In particular, the handlebar may be attached to the fork head via a handlebar mount 26. Rotation of the handlebar about the steering axis rotates the fork head 18 and the fork 12 relative to the bicycle frame 22.

In use, the fork head 18 is correspondingly aligned about the head tube 20 of the frame 22 to the riding direction of the bicycle 10. Such corresponding alignment of the fork head 18 with the steering direction of the bicycle 10 allows the fork head 18 to behave as a means for reducing the drag on the bicycle 10. For example, the fork head 18 remains aligned to the travel path of the bicycle 10. If the bicycle 10 is traveling to the left, then the fork head 18 is pointed to the left.

Figure 4:
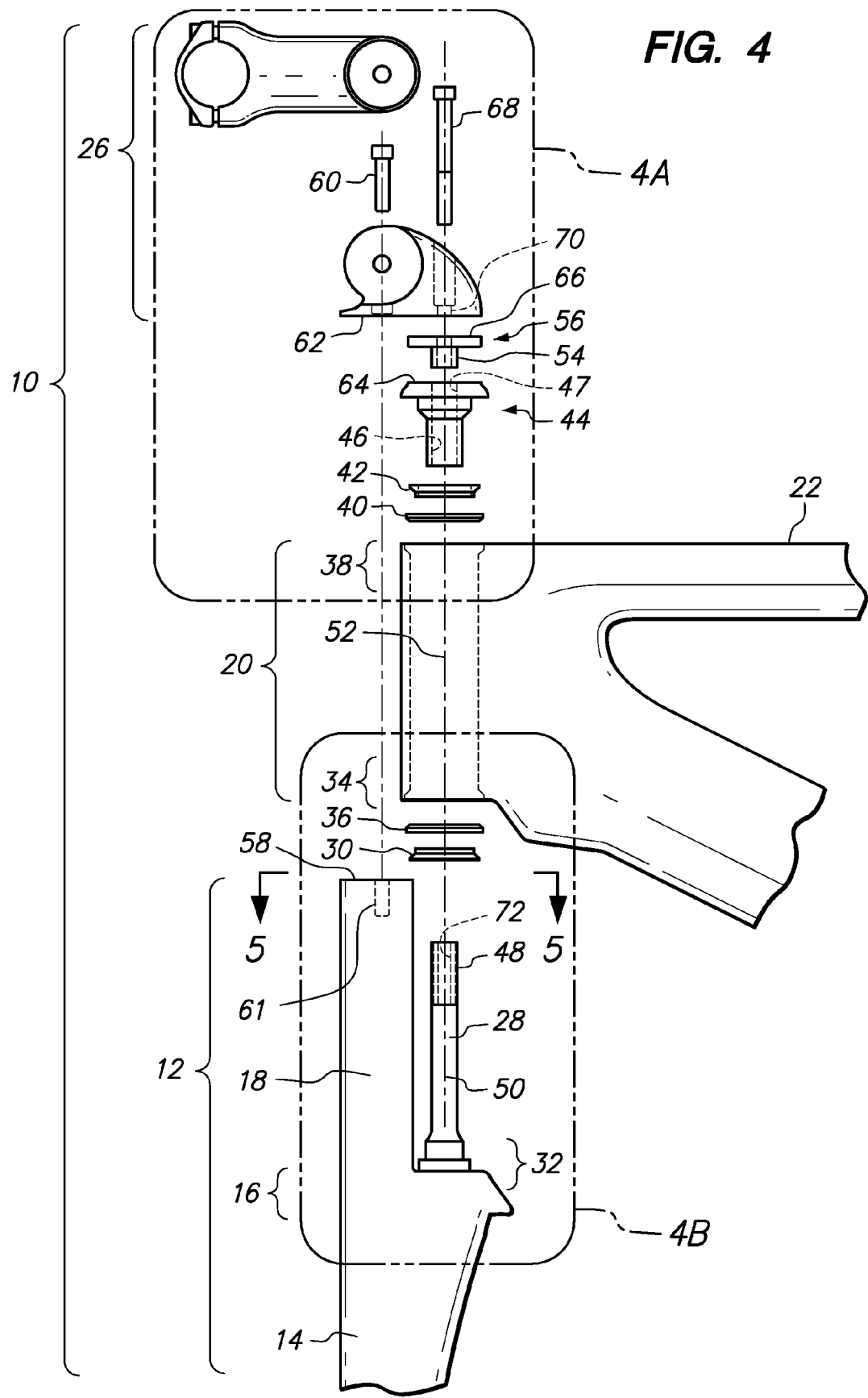
FIG. 4 is an exploded side of the bicycle shown in FIG. 3.

FIG. 4 is a side exploded view of the front end of the bicycle 10. The fork 12 may have the fork head 18, axis shaft 28, fork crown 16 and fork legs 14. The fork legs 14 are joined together at the fork crown 16. The axis shaft 28 may be attached to the fork crown 16. The fork head 18 may also be attached to the fork crown 16 and be positioned in front of the axis shaft 28. A fork crown race 30 is disposable at the base 32 of the axis shaft 28 (see FIGS. 4 and 4B) or may be formed as a unitary structure with the base 32 of the axis shaft 28. FIG. 4 illustrates a separate fork crown race 30 disposable at the base 32 of the axis shaft 28. To install the fork 12 onto the head tube 20 of the bicycle frame 22, a lower cup 34 for a lower bearing 36 is disposed at or formed as a unitary structure of the lower end portion of the head tube 20 (see FIGS. 4 and 4B). FIG. 4 illustrates the lower cup 34 as a unitary structure with the lower end portion of the head tube 20. The fork crown race 30 is disposed on the base 32 of the axis shaft 28. The lower bearing 36 is then placed on the fork crown race 30 and about the axis shaft 28. The axis shaft 28 is then inserted into the head tube 20. The fork crown race 30 and the lower cup 34 receive the lower bearing 36.

Figure 4A:
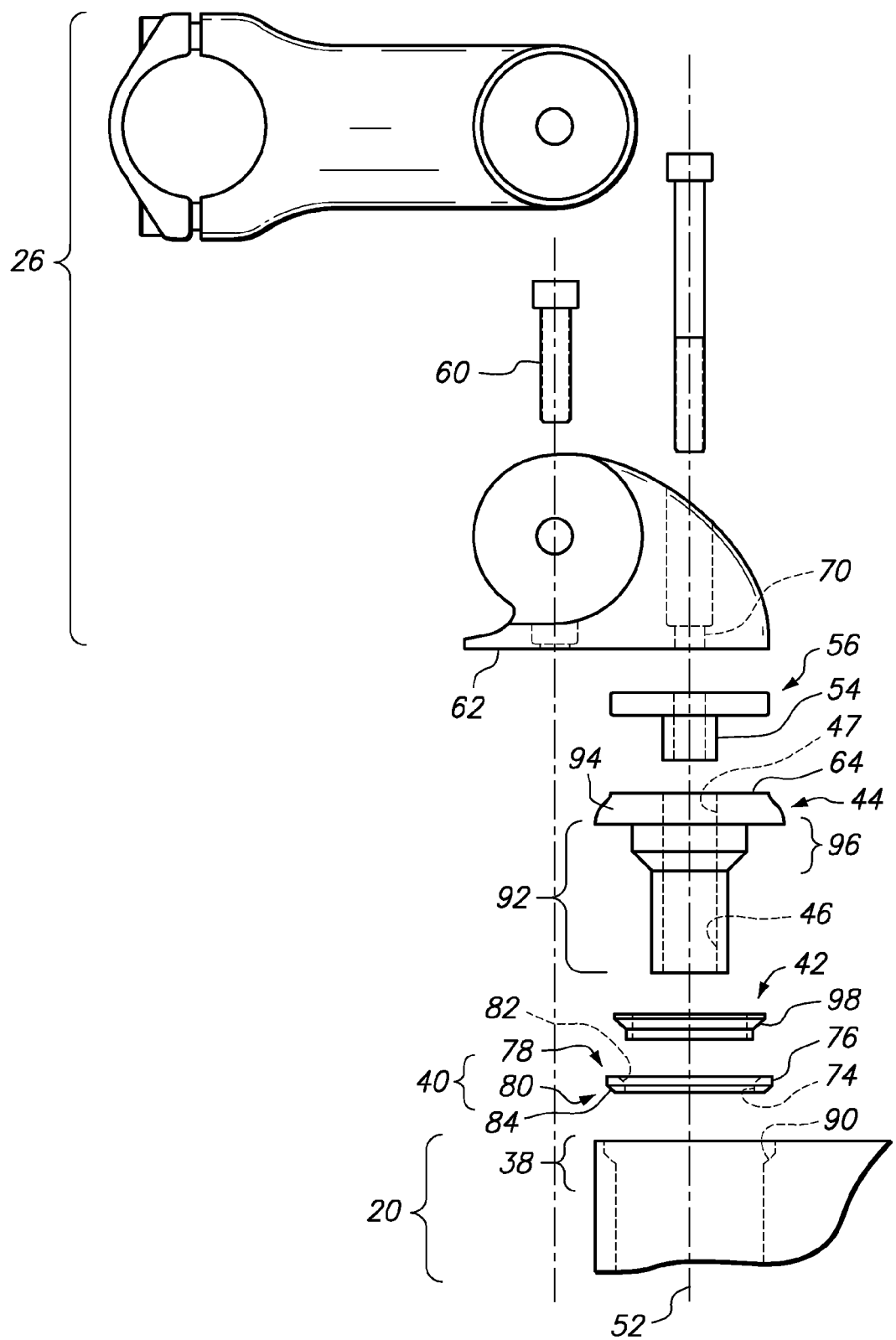
FIG. 4A is an enlarged view of an upper portion of the bicycle shown in FIG. 4.

Thereafter, an upper cup 38 for an upper bearing 40 is disposed at or formed as a unitary structure of the upper end portion of the head tube 20 (see FIGS. 4 and 4A). FIG. 4 illustrates the upper cup 38 as a unitary structure with the upper end portion of the head tube 20. A corresponding upper cone 42 is disposed at (see FIGS. 4 and 4A) or formed as a unitary structure of the bottom side of a headset cap 44. FIG. 4 illustrates the upper cone 42 as a separate part of the headset cap 44. The upper bearing 40 is inserted into the upper cup 38 and lower internal threads 46 (see FIGS. 4 and 4A) of the headset cap 44 is threaded onto external threads 48 of the axis shaft 28 at its upper distal portion. After the upper and lower bearings 40, 36 are mounted to the head tube 20 of the bicycle frame 22, the headset cap 44 is tightened onto the axis shaft 28 thereby pre-loading the upper and lower bearings 40, 36. As will be discussed further below, when the appropriate amount of pressure is applied to the bicycle front end, a fork rotational axis 50 (see FIG. 4) defined by the axis shaft 28 becomes aligned to a central axis 52 (see FIG. 4) of the head tube 20 of the bicycle frame 22, the fork 12 does not wobble and the fork 12 freely rotates about the head tube 20.

After the fork 12, bearings 36, 40, and headset cap 44 are assembled, as discussed above, the upper 40 and lower bearings 36 are preloaded by tightening the headset cap 44 to the axis shaft 28 until the fork 12 does not wobble, the fork rotational axis 50 (defined by the axis shaft 28) is aligned to the central axis 52 of the head tube 20 of the bicycle frame 22, and the fork 12 and fork head 18 are able to freely rotate relative to the bicycle frame 22. The head set locking screw 68 (discussed below), pin 110 (discussed below), handlebar mount 26 (discussed below) or other mechanism may be used to fix the position of the headset cap 44 to the axis shaft such that the headset cap 44 does not become loose while the rider is riding the bicycle 10. The fork 12 is now properly mounted to the bicycle frame 22.

Figure 5:
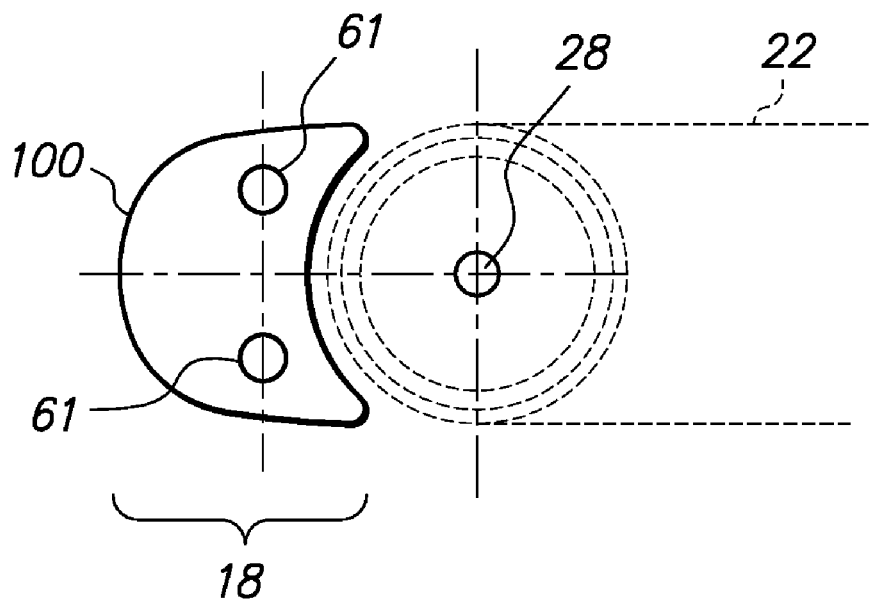
FIG. 5 is a top view of the fork head shown in FIG. 4.

Referring to FIGS. 4 and 4A, to mount the handlebar, external threads 54 of a steerer length compensator 56 may be threaded onto upper internal threads 47 of the headset cap 44 until the steerer length compensator 56 bottoms out on (i.e., touches) top of the headset cap 44. The handlebar mount 26 may then be attached to the fork head 18 at a top end thereof via one or more screws 60 received into threaded holes 61 (see FIG. 4) at the top end of the fork head 18. The threaded holes 61 for the screws 60 are best shown in FIGS. 4 and 5. After the handlebar mount 26 is attached to the fork head 18, a gap 63 (see FIG. 3) may exist between the bottom surface 62 of the handlebar mount 26 and the top surface 64 of the headset cap 44. The steerer length compensator 56 is raised from the headset cap 44 until a top surface 66 of the steerer length compensator 56 contacts the bottom surface 62 of the handlebar mount 26. A headset locking screw 68 may be inserted through an aperture 70 (see FIGS. 4 and 4A) formed through the handlebar mount 26 and secured to internal threads 72 formed at the upper portion of the axis shaft 28. The headset locking screw 68 compresses the axis shaft 28 to the headset cap 44 thereby locking the position of the headset cap 44 with respect to the axis shaft 28. This fixes the preload force applied to the upper 40 and lower bearings 36 such that the front end assembly does not become loose while the rider is riding the bicycle 10.

The upper and lower bearings 40, 36 may be standard bearings or integrated headset bearings sold by TH Industries, Part No. 1" ACB 36×45 373. Each of the bearings 40, 36 may provide rotational movement between an inner race 74 and an outer race 76 (see FIGS. 4A and 4B). Each of the bearings 40, 36 may define a first end portion 78 and a second end portion 80. The first end portion 78 may have an internal beveled surface 82 (see FIG. 4A) formed as part of the inner race 74. The second end portion 80 of the bearing may have an external beveled surface 84 (see FIG. 4A) formed as part of the outer race 76. Alternatively, the upper and lower bearings 40, 36 may be loose bearings, as discussed herein in relation to FIGS. 7 and 7A.

Figure 4B:
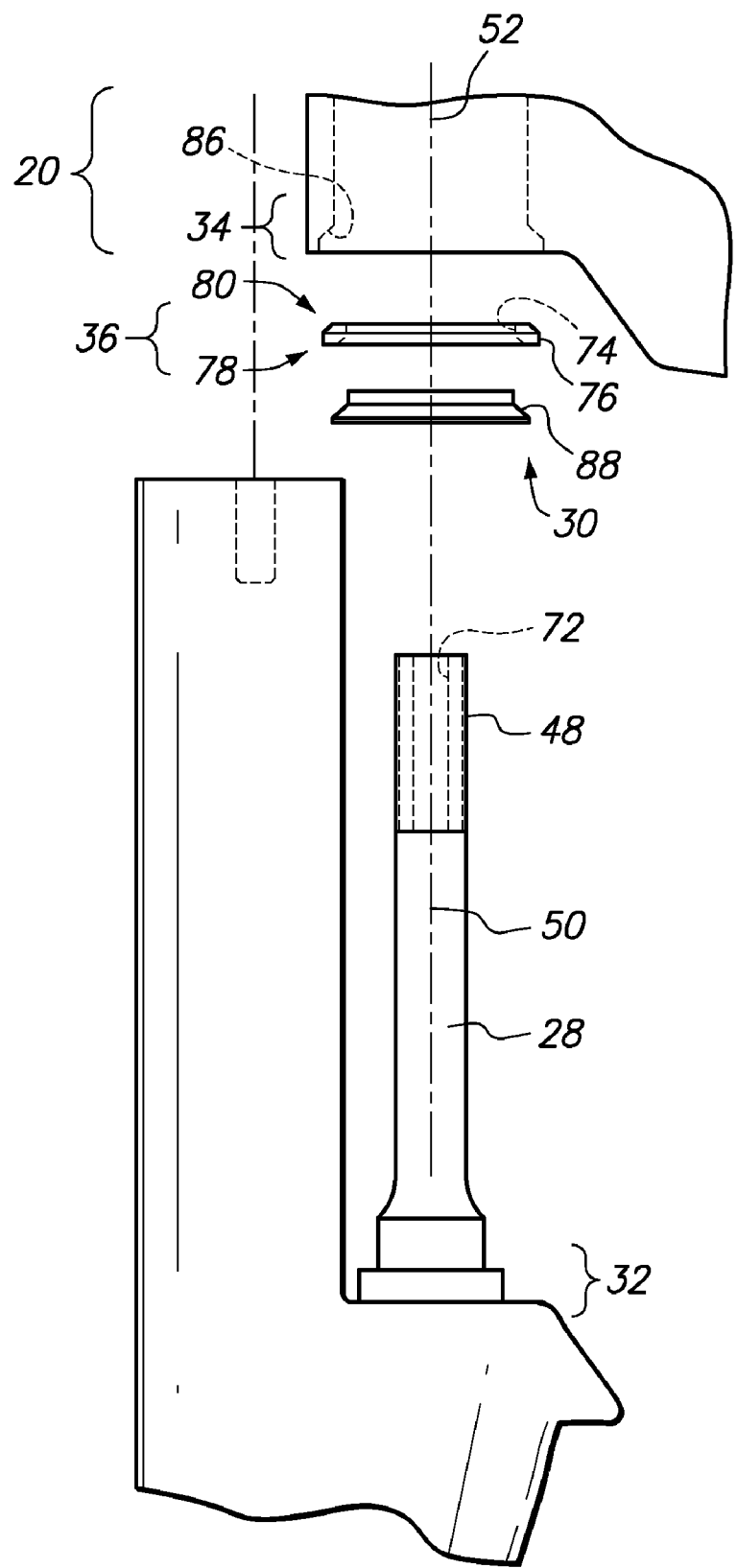
FIG. 4B is an enlarged view of a lower portion of the bicycle shown in FIG. 4.

To install the upper and lower bearings 40, 36 to the upper end portion and lower end portion of the head tube 20, respectively, the second end portions 80 of the upper and lower bearings 40, 36 are inserted into the head tube 20. In particular, the lower end portion of the head tube 20 may be integrally formed as a lower cup 34, as shown in FIGS. 4 and 4B. The lower cup 34 may have a mating beveled surface 86 (see FIG. 4B) which mates with the external beveled surface 84 of the second end portion of the lower bearing 36. The lower bearing 36 is then inserted into the lower end portion of the head tube 20 (i.e., lower cup 34) with the second end portion 80 being inserted first. The external beveled surface 84 of the lower bearing 36 then contacts the mating beveled surface 86 (see FIG. 4B) formed in the lower cup 34 of the lower end portion of the head tube 20.

A fork crown race 30 may be disposed at the base 32 of the axis shaft 28 and may receive the lower bearing 36. The fork crown race 30 may have a mating beveled surface 88 which mates with the internal beveled surface 82 of the first end portion 78 of the lower bearing 36. The axis shaft 28 is then inserted through the head tube 20 until the lower bearing 36 is seated between the lower cup 34 formed in the lower end portion of the head tube 20 and the fork crown race 30. Due to the mating beveled surfaces 86, 84 of the lower cup 34 and the lower bearing 36, the lower bearing 36 is centrally aligned to the central axis 52 of the head tube 20. Furthermore, due to the internal beveled surface 82 of the lower bearing 36 and the mating beveled surface 88 of the fork crown race 30, the fork crown race 30 and the base 32 of the axis shaft 28 are centered to the central axis 52 of the head tube 20.

The upper bearing 40 is disposed within the upper end portion of the head tube 20 in a similar manner compared to the lower bearing 36. In particular, the upper end portion of the head tube 20 may be integrally formed with an upper cup 38, as shown in FIGS. 4 and 4A. An internal beveled surface 90 (see FIG. 4A) may be formed in the upper cup 38. The upper bearing 40 may be inserted into the upper cup 38 with the second end portion 80 of the bearing being inserted first. The external beveled surface 84 of the second end portion 80 of the upper bearing 40 may mate with the beveled surface 90 of the upper cup 38. Such mating contact centers the upper bearing 40 with respect to the central axis 52 of the head tube 20. Thereafter, the headset cap 44 may be attached to the axis shaft 28. In particular, the headset cap 44 may have an elongate post 92 (see FIG. 4A) having lower internal threads 46. The upper distal end portion of the axis shaft 28 may have mating external threads 48. The lower internal threads 46 of the elongate post 92 may be threaded onto the external threads 48 of the axis shaft 28. The headset cap 44 may additionally have a radially outward extending flange 94 (see FIG. 4A) having an outer diameter greater than an inner diameter of the upper bearing 40 but is preferably greater than an outer diameter of the upper bearing 40. As the headset cap 44 is tightened onto the axis shaft 28, the radially outward extending flange 94 presses down on the first end portion 78 of the upper bearing 40. Also, the fork crown 16 is pulled upward to attach the fork 12 to the head tube 20 of the bicycle frame 22.

The lower surface of the headset cap may 44 be integrally formed as an upper cone 42. Alternatively, as shown in FIGS. 4 and 4A, a separate upper cone 42 may be disposed at a base 96 (see FIG. 4A) of the elongate post 92 and adjacent to the lower surface of the headset cap 44. The upper cone 42 may be sized and configured to receive the first end portion 78 of the upper bearing 40. In particular, the upper cone 42 may have a mating beveled surface 98 sized and configured to mate with the internal beveled surface 82 of the upper bearing 40. The beveled surfaces 98, 82, 84, 90 of the upper cone 42, the upper bearing 40 and the upper cup 38 align the axis shaft 28 (i.e., fork rotational axis 50) to the central axis 52 of the head tube 20.

As the headset cap 44 is tightened onto the axis shaft 28, the fork crown 16 and the outwardly extending flange 94 of the headset cap 44 compresses the upper bearing 40, head tube 20 and lower bearing 36 together. The beveled surfaces 82, 84, 86, 88, 90 align the fork rotational axis 50 (i.e., the central axis 52 of the axis shaft 28) to the central axis 52 of the head tube 20. To properly assemble the fork 12 to the head tube 20, the headset cap 44 is tightened onto the axis shaft 28 until the fork 12 does not wobble and the fork 12 is able to freely rotate. By way of example and not limitation, the headset cap 44 may be tightened onto the axis shaft 28 until the fork 12 does not freely rotate. At this point, the fork 12 does not wobble and the axis shaft 28 is aligned to the central axis 52 of the head tube 20 but at the same time, the fork 12 is unable to freely rotate for normal use. Thereafter, the headset cap 44 may be slightly loosened until the fork 12 is able to freely rotate. At this point, the fork 12 does not wobble and yet the fork 12 is able to freely rotate about the fork rotational axis 50.

Figure 5A:
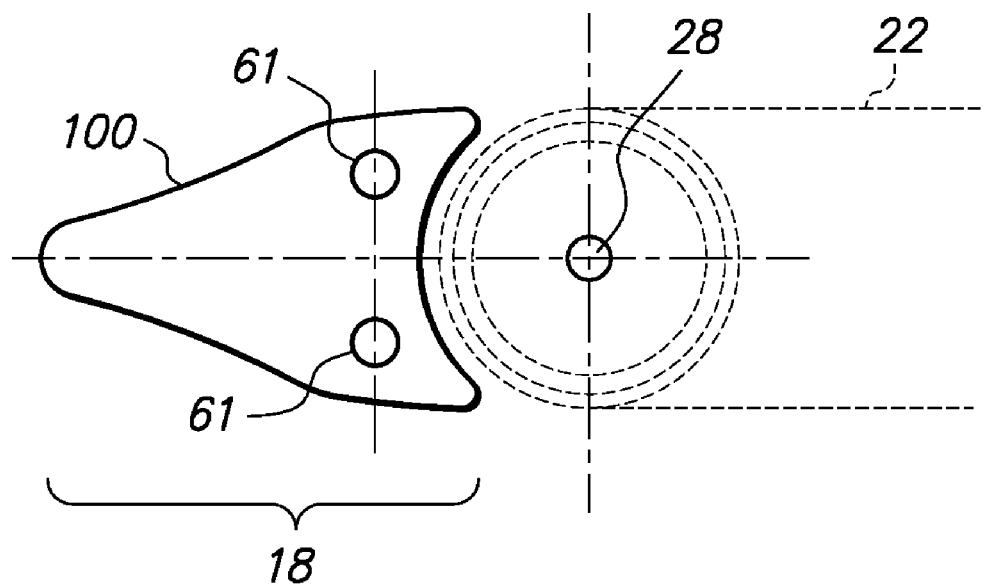
FIG. 5A is an alternate embodiment of the fork head shown in FIG. 5.

Referring now to FIG. 5, a cross sectional top view of the fork head 18 of FIG. 4 is shown. The fork head 18 may define a front surface 100. The front surface 100 may have a variety of different shapes for reducing the drag of the bicycle 10. By way of example and not limitation, the front surface 100 of the fork head 18 may have a rounded configuration, as shown in FIG. 5. Alternatively, the front surface 100 may have a V shaped configuration, as shown in FIG. 5A. Other configurations are also contemplated such as parabolic or half-body configuration so long as the fork head 18 is sufficiently stiff and strong to support the handlebar/handlebar mount 26 and to efficiently slice through air to reduce drag. The fork head 18 rotates about the head tube 20 according to the steering of the bicycle.

Figure 6:
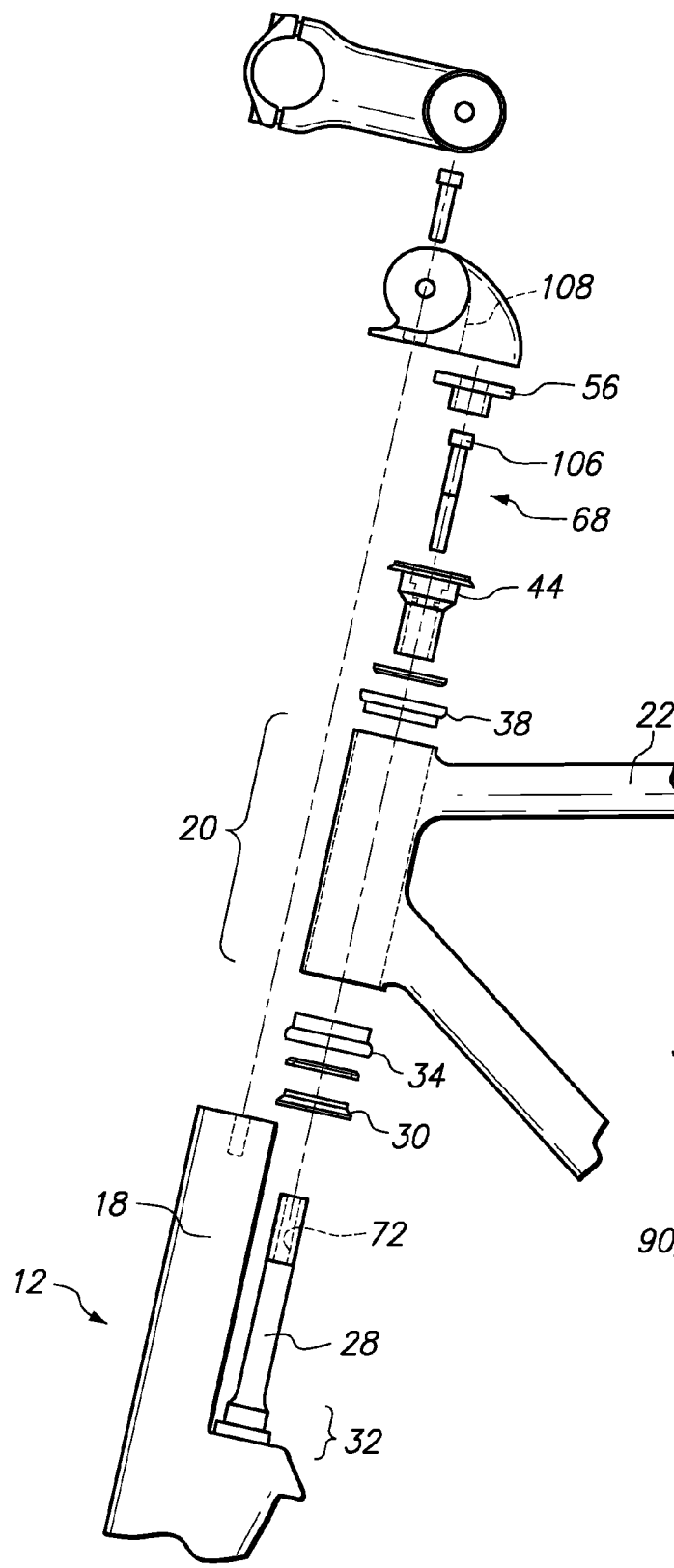
FIG. 6 is an exploded view of a fork with fork head sized and configured to mount onto a bicycle frame designed for a threadless headset wherein an axis shaft of the fork with fork head mounts to a head tube of the bicycle frame and a handlebar mounts to the fork head.
Figure 6A:
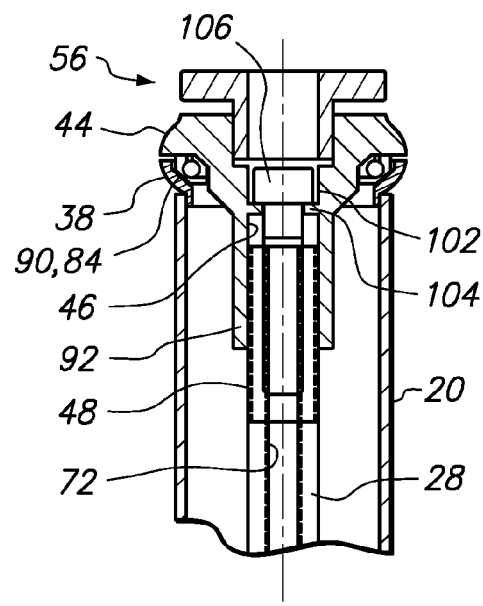
FIG. 6A is a cross sectional assembled view of the upper end portion of the head tube shown in FIG. 6A.

In an alternative embodiment, the beveled surfaces 86, 90 formed in the upper 38 and lower cups 34 may be formed in separate upper and lower 38, 34 cups as shown in FIGS. 6 and 6A. For example, separate upper cup 38 sized and configured to be received into the upper end portion of the head tube 20 may be fabricated. The upper cup 38 may have an internal beveled surface 90 (see FIG. 6A) which mates with the external beveled surface 84 of the second end portion 80 of the upper bearing 40. Similarly, a separate lower cup 34 sized and configured to be received into the lower end portion of the head tube 20 may be fabricated. The lower cup 34 may have an internal beveled surface 86 which mates with the external beveled surface 84 of the second end portion 80 of the lower bearing 36. The fork 12 may be assembled onto the head tube 20 via the steps discussed above. In particular, a fork crown race 30 may be disposed at the base 32 of the axis shaft 28. The axis shaft 28 may be inserted into the head tube 20 with the separate lower cup 34 disposed at the lower end portion of the head tube 20 and the lower bearing 36 disposed between the lower cup 34 and the fork crown race 30. Thereafter, the separate upper cup 38 may be disposed at the upper end portion of the head tube 20 and the upper bearing 40 disposed in the separate upper cup 38. The headset cap 44 may then be screwed onto the axis shaft 28 and tightened such that the fork 12 does not wobble but yet is able to freely rotate.

In the various embodiments discussed herein, the fork crown race 30 may be formed as a unitary structure with the axis shaft 28 or the fork crown 16. Alternatively, the fork crown race 30 may be formed as a separate structure, as shown in FIGS. 4, 4B and 6. The separate fork crown race 30 may have a split ring configuration. An inner diameter of the separate fork crown race 30 may be slightly smaller compared to an outer diameter of the base 32 of the axis shaft 28. To install the separate fork crown race 30 at the base 32 of the axis shaft 28, the fork crown race 30 is pressed over the base of the axis shaft 28. The fork crown race 30 may have a beveled surface 88 (see FIG. 4B) which mates with the internal beveled surface of the first end portion 78 of the lower bearing 36.

Similarly, the upper cone 42 may be formed as a unitary structure with the headset cap 44. Alternatively, the upper cone 42 may be formed as a separate structure, as shown in FIGS. 4 and 4A. The separate upper cone 42 may have a split ring configuration. An inner diameter of the separate upper cone 42 may be slightly smaller compared to an outer diameter of the base 96 of the elongate post 92 of the headset cap 44. To install the separate upper cone 42 to the base 96 of the elongate post 92 of the headset cap 44, the separate upper cone 42 is pressed over the base 96 of the elongate post 92. The separate upper cone 42 may have a beveled surface 98 (see FIG. 4A) which mates with the internal beveled surface 82 of the first end portion 78 of the upper bearing 40.

In an alternative embodiment of installing the upper and lower bearings 40, 36, the first end portions 78 of the upper and lower bearings 40, 36 may be inserted into the head tube 20. The upper end portion and lower end portion of the head tube 20 may have beveled surfaces which mate with the internal beveled surfaces 82 of the upper and lower bearings 40, 36. Also, the fork crown race 30 may have a beveled surface which mates with the external beveled surface 84 of the second end portion 90 of the lower bearing 36. Also, the head set cap 44 may have a beveled surface which mates with the external beveled surface 84 of the second end portion 90 of the upper bearing 40. The respective beveled surfaces mate with each other to align the fork rotational axis 50 defined by the axis shaft 28 to the central axis 52 of the head tube 20 such that the fork 12 does not wobble and the fork 12 freely rotates about the head tube 20 when the upper and lower bearings 40, 36 are preloaded.

In the various embodiments and aspects discussed herein, as an alternative embodiment to locking the headset cap 44 to the axis shaft 28 via a headset locking screw 68 inserted into the aperture 70 (see FIGS. 4 and 4A) of the handlebar mount 26, the headset locking screw 68 may be directly locked onto the headset cap 44 and the axis shaft 28, as shown in FIGS. 6 and 6A. In particular, the elongate post 92 of the headset cap 44 may be formed with internal threads 46 formed at a lower distal portion of the elongate post 92. The lower internal threads 46 formed at the lower distal portion of the elongate post 92 may be threadingly engaged to the external threads 48 formed on the upper distal portion of the axis shaft 28. A hex recess 102 may be formed above the lower internal threads 46 of the headset cap 44. A flange 104 in the headset cap 44 may be sized and configured to receive a head 106 of the headset locking screw 68. After the headset cap 44 is threaded onto the axis shaft 28 and the upper and lower bearings 40, 36 properly pre-loaded, the headset locking screw 68 is inserted through the hex recess 102 and threaded into the internal threads 72 at the upper distal portion of the axis shaft 28. The headset locking screw 68 is tightened onto the flange 104 to lock the position of the headset cap 44 to the axis shaft 28. This also locks the pre load on the upper and lower bearings 40, 36 such that the headset cap 44 does not loosen up while the rider is riding the bicycle 10. Thereafter, as an optional component, the steerer length compensator 56 may be threaded onto the headset cap 44 until the steerer length compensator 56 is bottomed out on the headset cap 44. The handlebar mount 26 may be attached to the fork head 18, as discussed above. After the handlebar mount 26 is attached to the fork head 18, the steerer length compensator 56 may be adjusted upward to eliminate any gap between the handlebar mount 26 and the headset cap 44. Alternatively, a skirt may be mounted to the handlebar mount and/or the headset cap for covering the gap 63 between the bottom surface of the handlebar mount and the top surface of the headset cap.

Figure 9:
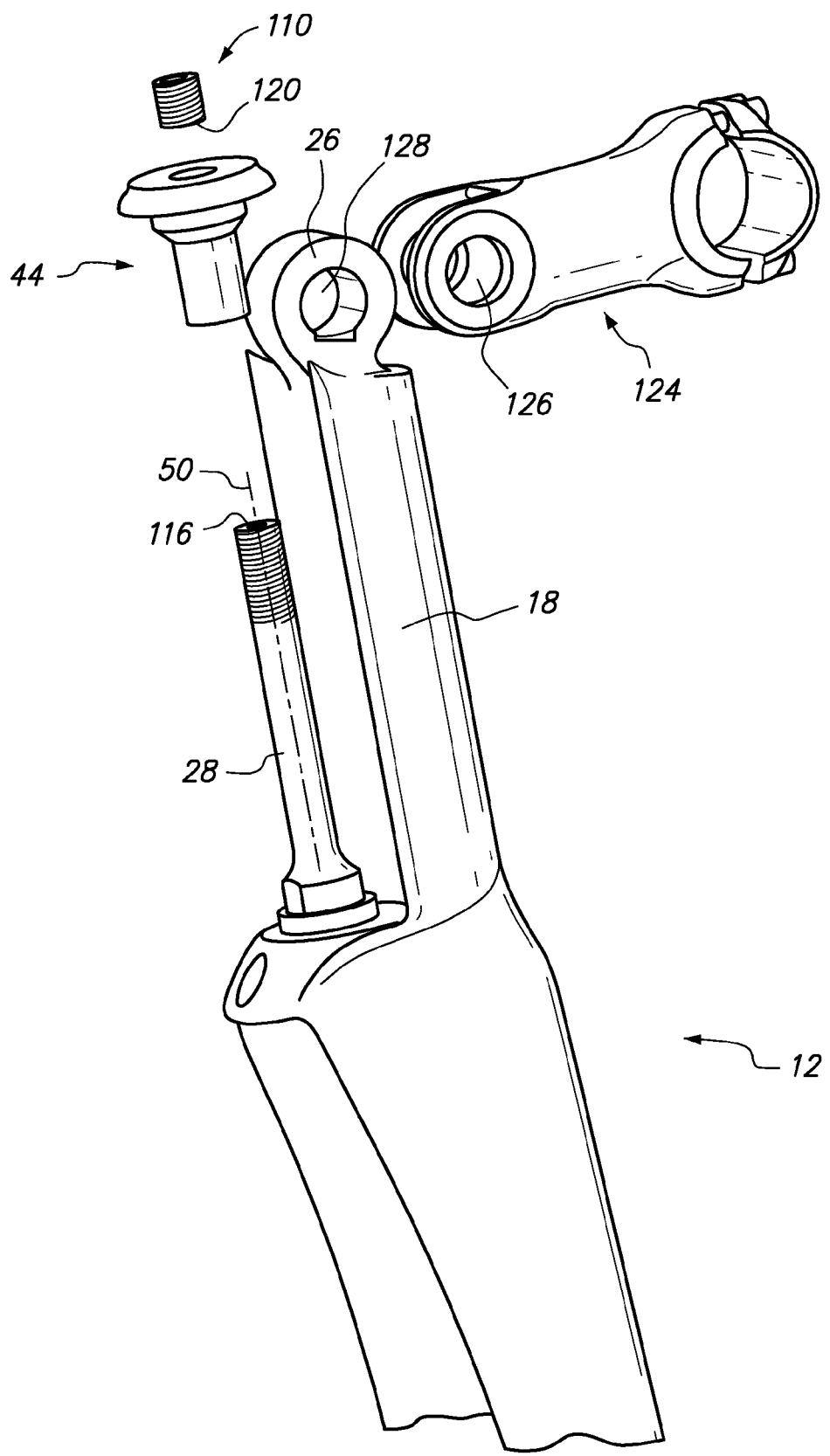
FIG. 9 is side perspective view of a fork with a handlebar mount fabricated from a unitary material with a fork head and a handlebar stem removeably attachable to the handlebar mount.

Alternatively, it is contemplated that the handlebar mount 26 may be shortened such that the handlebar mount 26 does not extend over the head tube 20 as shown by the dashed lines 108 in FIG. 6. In this alternative embodiment, the steerer length compensator may be eliminated and a cap may be disposed over the headset cap 44 for aesthetic purposes. Moreover, as shown in FIG. 9, the handlebar mount 26 may be fabricated as a unitary member with the fork head 18. The fork 12 may be mounted to the head tube 20 solely via attachment with the axis shaft 28. To mount the fork 12 to the head tube 20 of the bicycle 10, the axis shaft 28 is inserted through the head tube 20. The lower bearing 36 is disposed between the lower end portion of the head tube 20 and a fork crown race 30. The upper bearing 40 is disposed between the upper end portion of the head tube 20 and the head set cap 44. The head set cap 44 is tightened onto the axis shaft 28. As the head set cap 44 is tightened onto the axis shaft 28, the upper and lower bearings 40, 36 are preloaded and the fork rotational axis 50 defined by the axis shaft 28 is aligned to the central axis 52 of the head tube 20 such that the fork 12 does not wobble and the fork 12 freely rotates about the head tube 20. To lock the preload of the upper and lower bearings 40, 36, the threaded pin 110 may be threaded into the upper internal threads 47 of the head set cap 44. The threaded pin 110 is further threaded into the upper internal threads 47 and possibly into the lower internal threads 46 until the bottom surface 120 of the threaded pin 110 contacts a top distal end 116 of the axis shaft. The threaded pin 110 is cinched onto the axis shaft 28 to hold the preload force on the upper and lower bearings 40, 36. A handlebar stem 124 may be attached to the handlebar mount 26 by aligning apertures 124, 126 of the handlebar mount 26 and the handlebar stem 124, inserting a bolt through the aligned apertures 128, 126, threading a nut onto the bolt, tightening the nut and bolt to lock the angular position of the handlebar stem 124.

Figure 7:
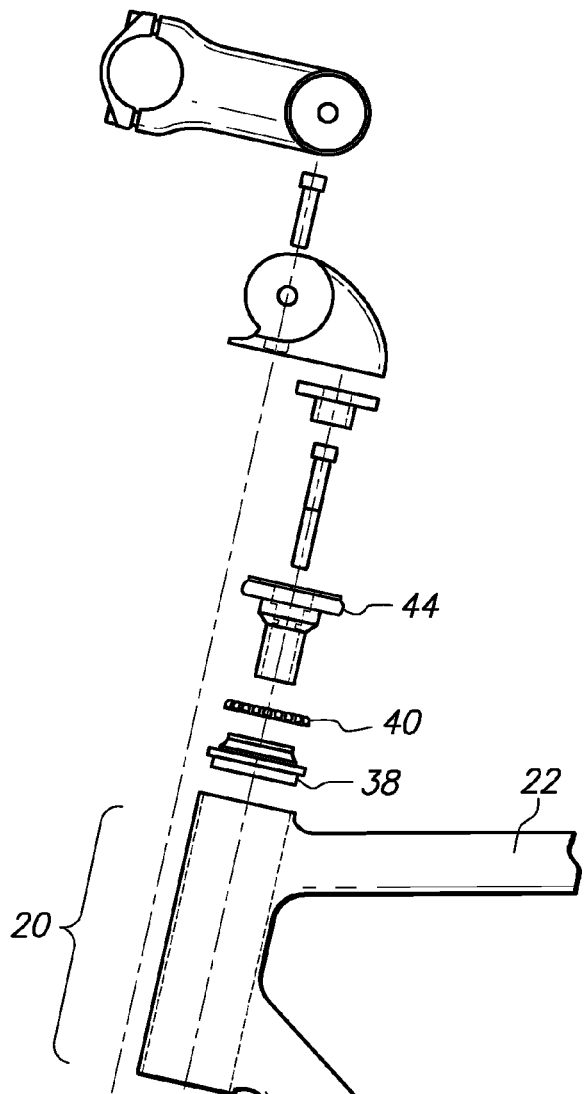
FIG. 7 is an exploded view of a fork with fork head sized and configured to mount onto a bicycle frame designed for a threaded headset wherein an axis shaft of the fork with fork head mounts to a head tube of the bicycle frame and a handlebar mounted to the fork head.

In an aspect of the bicycle front end assembly, the fork 12 with fork head 18 may be installed on a conventional bicycle, non-conventional bicycle, a bicycle having a threadless headset (see FIG. 6) or a bicycle having threaded headset (see FIG. 7). The fork 12 with fork head 18 may be installed on any bicycle frame with a head tube 20. In particular, a separate lower cup 34 and a separate upper cup 38 may be respectively formed to be receivable into the lower and upper end portions of the head tube 20. The separate lower 34 and upper cups 38 may be sized and configured to respectively receive the upper 40 and lower bearings 36.

Figure 7A:
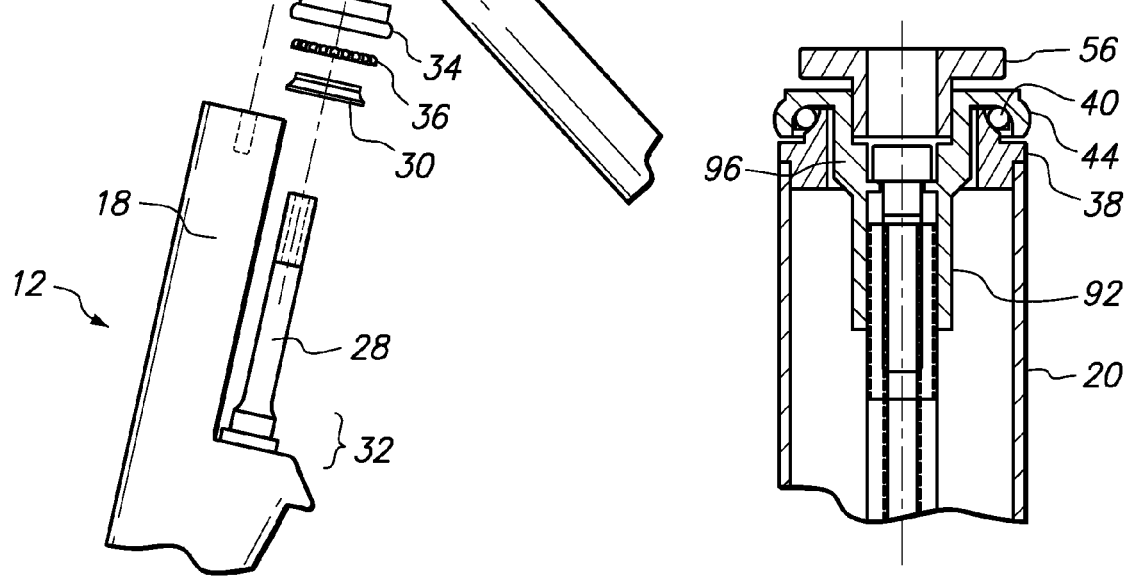
FIG. 7A is a cross sectional assembled view of the upper end portion of the head tube shown in FIG. 7.

Alternatively, the existing upper 40 and lower bearings 36 of the bicycle head tube 20 may be used. By way of example and not limitation, the existing upper and lower bearings 40, 36 may be loose bearings, as shown in FIGS. 7 and 7A. In this case, the lower cup 34 disposed at the lower end portion of the head tube 20 receives the lower bearing 36. A fork crown race 30 sized and configured to receive the lower bearings 36 may be formed as a unitary structure with the base 32 of the axis shaft 28 or formed as a separate structure and disposed at the base 32 of the axis shaft 28 (see FIG. 7). The fork crown race 30 and the lower cup 34 receive the lower bearing 36. The upper cup 38 disposed at the upper end portion of the head tube 20 receives the upper bearing 40. An upper cone 42 sized and configured to receive the bearing may be formed as a unitary structure with the base 96 of the elongate post 92 of the headset cap 44 (as shown in FIGS. 7 and 7A) or formed as a separate structure and disposed at the base 96 of the elongate post 92 of the headset cap 44. To mount the fork 12 to the head tube 20, the axis shaft 28 is inserted into the head tube 20 with the lower bearing 36 disposed between the fork crown race 30 and the lower cup 34. The headset cap 44 is screwed onto the distal end portion of the axis shaft 28 with the upper bearing 40 disposed between the separate upper cup 38 and the integrally formed upper cone 42. The headset cap is tightened onto the axis shaft until the upper and lower bearings are properly preloaded such that the fork does not wobble, the fork rotational axis and central axis of the head tube are aligned and the fork is able to freely rotate about the head tube.

In an aspect of the bicycle front end assembly, it is contemplated that the fork crown race 30 and the upper cone 42 are optional parts. The base 32 of the axis shaft 28 may be sized and configured to receive a sealed cartridge bearing. In particular, the internal surface of the sealed cartridge bearing may be fitted to the external surface of the axis shaft base 28. Similarly, the base 96 of the elongate portion 92 of the headset cap 44 may be sized and configured to receive a sealed cartridge bearing. The internal surface of the sealed cartridge bearing may be fitted to the external surface of the base 96 of the elongate portion 92 of the headset cap 44. The fit between the bearings and bases of the elongate post 92 and axis shaft 28 may be sufficient to center the upper 40 and lower bearings 36.

In the various embodiments discussed herein, the headset cap 44 may be tightened onto the axis shaft 28 or loosened off of the axis shaft 28 via a tool interface (e.g., hex recess 102 as discussed above in relation to FIG. 6A). Additionally, the steerer length compensator 56 may be screwed into or loosened off of the headset cap 44 with the aid of ridges and/or indentations formed about an outer periphery of an upper flange of the steerer length compensator 56. Moreover, the bicycle frame 22 and the various components discussed herein may be fabricated from fiber composite material, carbon fiber, aluminum, steel or other material used for bicycles.

In an aspect of the embodiments discussed herein, the axis shaft 28 above the base 32 may have an outer diameter as required to provide sufficient support to withstand stresses due to riding over bumps, turning, etc. or other maneuvering of the bicycle. By way of example and not limitation, the outer diameter of the axis shaft above the base may be greater than one inch or less than one inch. Preferably, the outer diameter of the axis shaft above the base is less than one inch, as is currently shown in the figures. In this manner, the front profile of the head tube may be minimized so as to reduce the drag coefficient of the bicycle. Nonetheless, if the embodiments shown in FIGS. 4, 6 and 7 incorporate an axis shaft having an outer diameter above the base greater than or equal to one inch, then the bicycle components discussed herein may resized and configured to fit such axis shaft.

In another aspect of the embodiments discussed herein, when the upper and lower ends of the head tube is described as being sized and configured to respectively receive the upper and lower bearings, it is contemplated that the upper and lower cups are either separately or unitarily formed with the head tube, as discussed herein, and/or it is also contemplated that upper and lower cones may be separately or unitarily formed with the head tube.

In another aspect of the embodiments discussed herein, the handlebar mount is shown with a stem that is rotateable as shown by arrow 122 (see FIG. 3). However, the handlebar mount may be fixed stem which is not rotateable. As such, the handlebar mount should not be limited to only rotateable stems.

Figure 8:
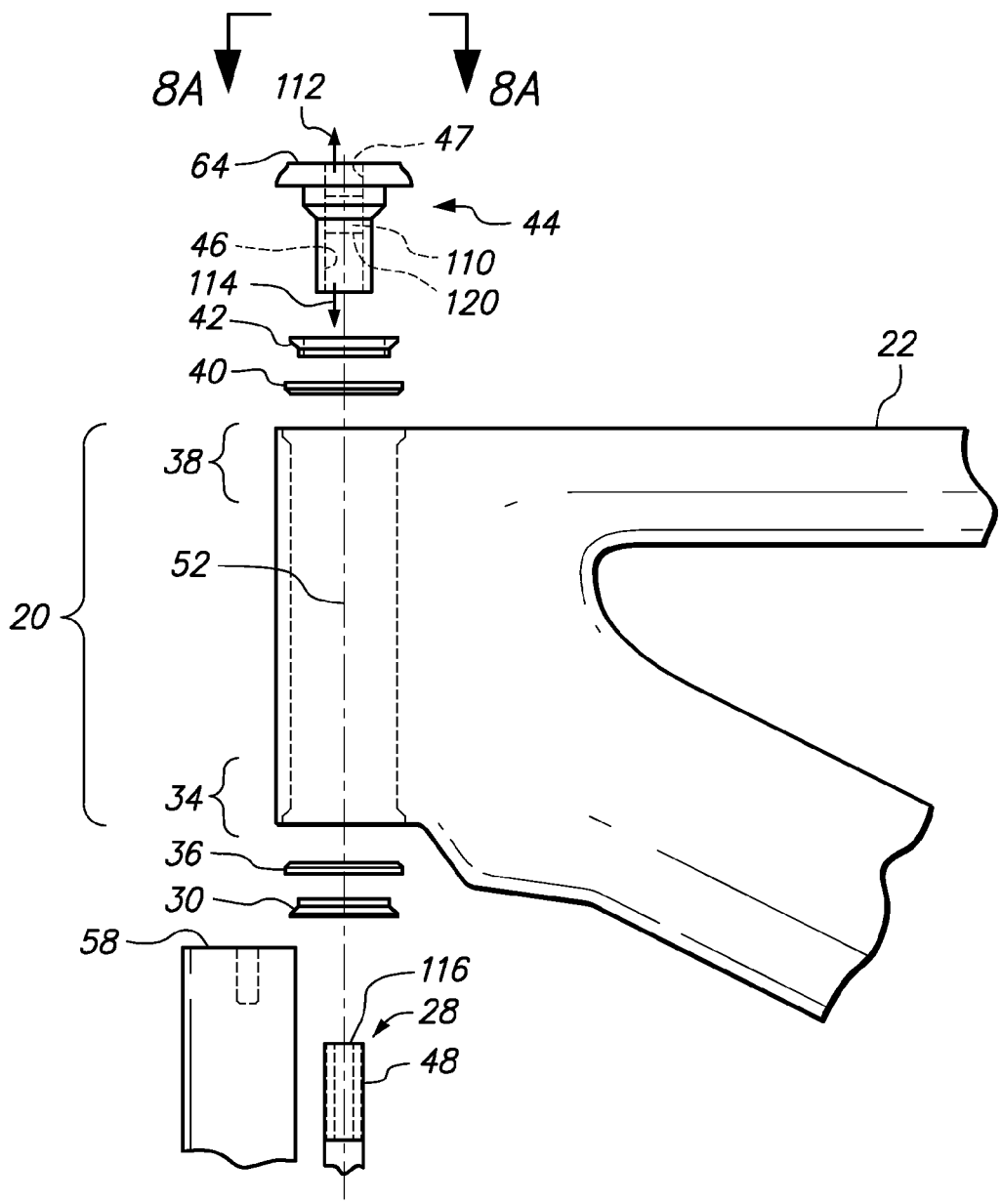
FIG. 8 is an enlarged side view of the bicycle illustrating an alternate embodiment of the headset being locked onto the axis shaft.
Figure 8A:
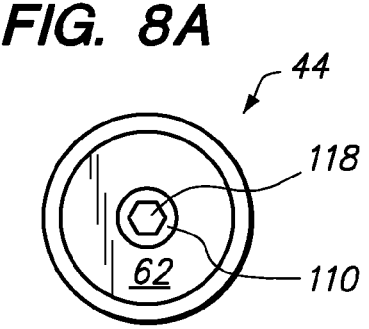
FIG. 8A is a top view of the headset cap.

Referring now to FIGS. 8 and 8A, in an aspect of the bicycle 10, the headset cap 44 may be fixed to the axis shaft 28 via a threaded pin 110 that may be threaded downward or upward through the headset cap 44 as shown by up and down arrows 112, 114.

The outer surface of the pin 110 may be threaded. Also, the upper and lower threads 47, 46 may be threaded. The upper and lower threads 46, 47 may be integrally formed with each other such that the pin 110 can be traversed upward into engagement with the upper threads 47 by rotating the pin 110 or the pin 110 can be traversed downward into engagement with the lower threads 46 by rotating the pin 110.

To mount the fork 12 to the head tube 20 of the bicycle frame 22, the upper and lower bearings 40, 36 may be preloaded as discussed above by tightening down the headset cap 44 onto the axis shaft 28. Once the upper and lower bearings 40, 36 are properly pre loaded, the headset cap 44 should be fixed to the axis shaft 28 such that the headset cap 44 does not become loose while the rider is riding the bicycle 10.

As discussed above, the headset locking screw 68 fixes the headset cap 44 to the axis shaft 28. As an alternate means of fixing the headset cap 44 to the axis shaft 28, the pin 110 may have external threads. The external threads of the pin 110 are threadably engageable to the upper and lower internal threads 47, 46 of the headset cap 44. The pin 110 is initially disposed adjacent the upper internal threads 47. The reason is that the lower internal threads 46 of the headset cap 44 are threaded onto the external threads 48 of the axis shaft 28. The pin 110 should not contact the top distal end 116 of the axis shaft 28 when the upper and lower bearings 40, 36 are being pre loaded. After the upper and lower bearings 40, 36 are pre loaded, the pin 110 is rotated clockwise to traverse the pin 110 into engagement with the top distal end 116 of the axis shaft 28. The pin 110 may be formed with a hex recess 118 (see FIG. 8A). An allen wrench may be inserted into the hex recess 118 and rotated clockwise. It is contemplated that the pin 110 may be rotated via other methods. The recess 118 may have a star configuration, and a corresponding wrench with a star configured distal tip may be used to rotate the pin 110. When the wrench is rotated in the clockwise direction, the pin 110 is also rotated in the clockwise direction and traversed toward the distal top end 116 of the axis shaft 28. When a bottom surface 120 of the pin 110 contacts the top distal end 116 of the axis shaft 28, the user may synch the pin 110 onto the axis shaft 28 thereby fixing the position of the headset cap 44 to the axis shaft 28. In this manner, the headset cap 44 will not become loose while the rider is riding the bicycle 10.

The allen wrench is provided by way of example and not limitation. Other means could be employed. Generally, a tool interface may be formed on the pin. A tool may then be used to turn the pin to traverse the pin up or down in the headset cap.

Figure 10:
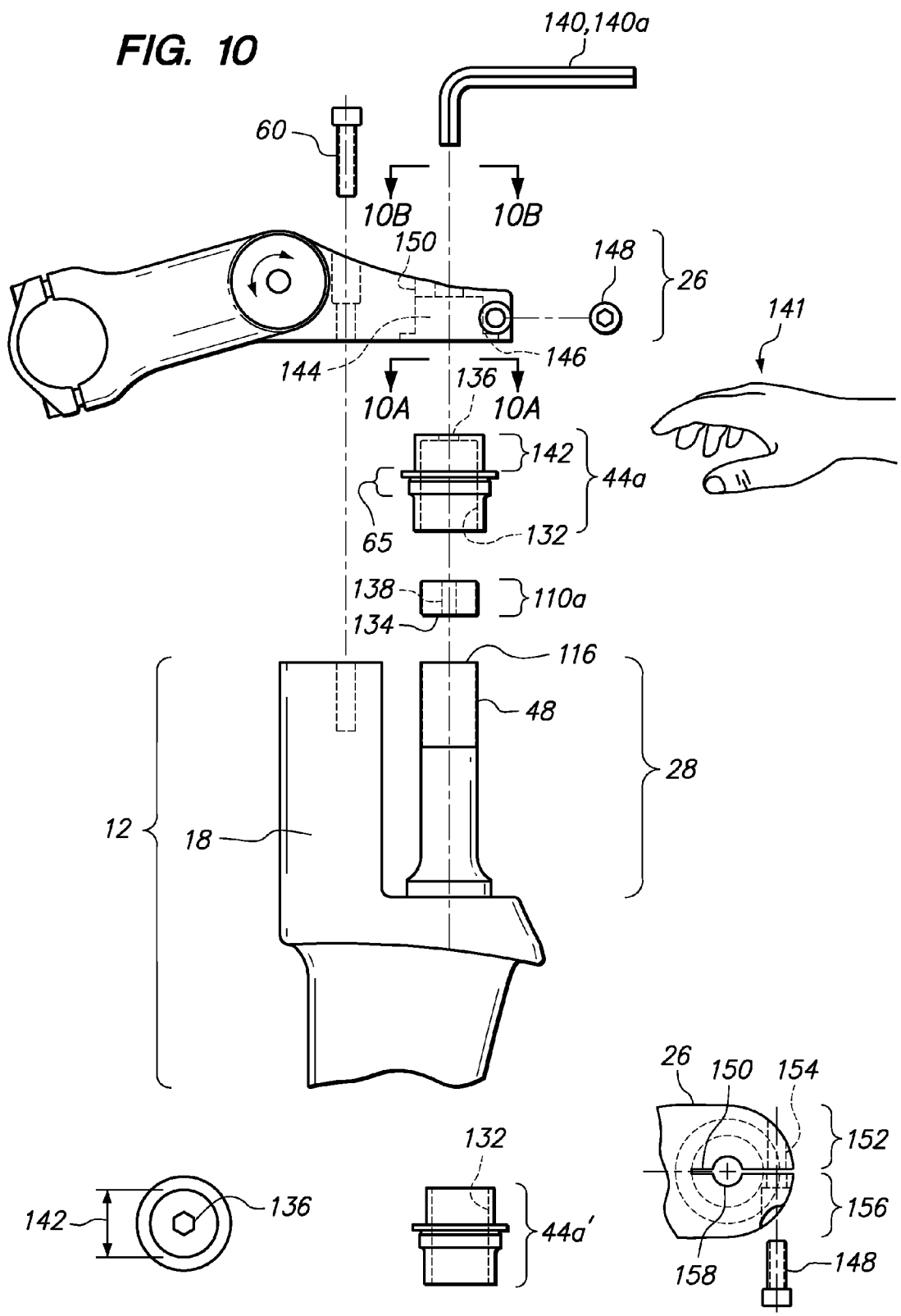
FIG. 10 illustrates an alternate embodiment for locking the headset cap onto the axis shaft.

Referring now to FIG. 10, an alternate embodiment is shown. In particular, a headset cap 44a may be threaded to external threads 48 of an axis shaft 28 to provide preload to upper and lower bearings 40, 36 (not shown in FIG. 10; see FIGS. 4, 6, 7 and 8) to allow the fork 12 to freely rotate about head tube 20 (not shown in FIG. 10; see FIGS. 4, 6, 7 and 8) but yet not wobble during use. The upper and lower bearings 40, 36 may be mounted between the headset cap 44a and a fork crown race 30 either with integrally formed or separately formed cups, cones and fork crown race as discussed herein. The headset cap 44a may have an internal thread(s) 132 which extends from the bottom end of the headset cap 44a to the top. A threaded pin 110a may threadably engage the internal threads 132 of the headset cap 44a. Initially, the threaded pin 110a may be threaded all the way into the internal threads 132 such that the threaded pin 110a is near the top of the headset cap 44a. To preload the upper and lower bearings 40, 36, the lower bearing 36 is disposed between the fork crown race 30 and the head tube 20. The axis shaft 28 is inserted through the head tube 20 and may protrude up out of the top of the head tube 20. The upper bearing 40 may be disposed on top of the head tube 20. The internal threads 132 of the headset cap 44a are threaded onto the external threads 48 of the axis shaft 28. The headset cap 44a is threaded onto the axis shaft 28 until the appropriate amount of preload on the bearings 40, 36 is reached.

At this point, a lower surface 134 of the threaded pin 110a does not contact a top distal end 116 of the axis shaft 28. Also at this point, there may be some slack or play between the internal threads 132 of the headset cap 44a and the external threads 48 of the axis shaft. To remove the slack or play from the threaded engagement there between, the threaded pin 110a may be cinched onto the axis shaft 28. More particularly, the lower surface 134 of the threaded pin 110a may be pushed against the top distal end 116 of the axis shaft 28 by turning the threaded pin 110a. This removes the slack or play between the threaded engagement of the internal threads 132 of the headset cap 44a and the external threads 48 of the axis shaft 28. Additionally, during use, the threaded pin 110a prevents loosening of the headset cap 44a due to vibration, etc.

To rotate the headset cap 44a for applying the preload on the upper and lower bearings 40, 36 and to rotate the threaded pin 110a, the headset cap 44a and the threaded pin 110a may have hex recesses 136, 138. The hex recess 138 for the threaded pin 110a may be smaller than the hex recess 136 for the headset cap 44a. By way of example and not limitation, the hex recess 138 may fit a six (6) millimeter allen wrench, whereas, the hex recess 136 for the headset cap 44a may fit an eight (8) millimeter allen wrench. As discussed above, initially, the threaded pin 110a is threaded all the way up into the headset cap 44a. To adjust the preload on the upper and lower bearings 40, 36, an eight (8) millimeter allen wrench 140 may be inserted into the hex recess 136 (see FIG. 10A) of the headset cap 44a. The allen wrench 140 may be used to tighten the headset cap 44a onto the axis shaft 28. Alternatively, the preload on the upper and lower bearings 40, 36 may be adjusted by turning the headset cap 44a by hand 141. The user would grasp a cylindrical portion 142 (discussed below) or the flange 65 of the headset cap 44a with his or her hand to turn the headset cap 44a and adjust the preload on the upper and lower bearings 40, 36. When the appropriate amount of preload is achieved, the eight (8) millimeter allen wrench 140 is removed and a six (6) millimeter allen wrench 140a may be inserted through the hex recess 136 and engaged to the six (6) millimeter hex recess 138 of the threaded pin 110. The six (6) millimeter allen wrench may turn the threaded pin 110a into engagement with the axis shaft 28. More particularly, the allen wrench 140a turns the threaded pin 110a until the lower surface 134 of the threaded pin 110a is cinched onto the top distal end 116 of the axis shaft 28. As discussed herein, the threaded pin 110a removes slack between the internal threads 132 of the headset cap 44a and the external threads 48 of the axis shaft 28 and also prevents unwanted loosening of the headset cap 44a such as due to vibration during use. A top view of the headset cap 44a is shown which shows the hex recess 136. The hex recess 138 of the threaded pin 110a is shown as a through hole. However, it is also contemplated that the hex recess 138 may be a depression with a hex configuration. The depth of the depression may be sufficient to engage the six (6) millimeter allen wrench 140a and provide enough torquing to allow the threaded pin 110a to be cinched onto the axis shaft 28.

The handlebar mount 26 may then be mounted to the fork 12. In particular, the handlebar mount 26 may be attached to a fork head 18 via bolt 60. When the handlebar mount 26 is attached to the fork head 18, the cylindrical portion 142 of the headset cap 44a may be received into a cylindrical recess 144 of the handlebar mount 26. The handlebar mount 26 does not push down on the headset cap 44a. Rather, the cylindrical portion 142 may generally slide freely in and out of the cylindrical recess 144 of the handlebar mount 26. The handlebar mount 26 may additionally have a recess 146 to receive the flange 65 of the headset cap 44a. Once the handlebar mount 26 is mounted to the fork head 18 via the bolt 60, bolt 148 may be threaded onto the handlebar mount 26. As shown in FIGS. 10 and 10B, the cylindrical recess 144 incorporates a slot 150. A first half 152 of the handlebar mount 26 may have a threaded through hole 154. A second half 156 may have a through hole with a counter sunk recess for receiving a head of the bolt 148. The countersunk recess provides for a more aerodynamic shape for the purposes of reducing aerodynamic drag. With the cylindrical portion 142 disposed within the cylindrical recess 144, the bolt 148 may be threaded onto the threaded through hole 154. As the bolt 148 is tightened, the first and second halves 152, 156 begin to deflect inwardly and press upon the cylindrical portion 142. This provides frictional engagement between the cylindrical portion 142 of the headset cap 44a and the inner surface of the cylindrical recess 144. This also provides resistance to unwanted rotation of the headset cap 44a due to vibration or other causes during use of the bicycle.

Referring to FIG. 10B, the handlebar mount 26 may have a circular aperture 158 which may be large enough to receive the allen wrench 140 which in this example is an eight (8) millimeter allen wrench. In this manner, adjustments to the preload on the upper and lower bearings 40, 36 may be made without removal of the handlebar mount 26 from the fork head 18. The bolt 148 is loosened. The allen wrench 140a configured to fit the hex recess 138 of the threaded pin 110a is used to loosen the threaded pin 110a off of the axis shaft 28. Thereafter, the allen wrench 140 may be received into the hex recess 136 to adjust the preload on the upper and lower bearings 40, 36. After the preload is reset, the entire assembly may be retightened as discussed above.

Alternatively, the circular aperture 158 may be large enough to receive the allen wrench 140a but not allen wrench 140. The allen wrench 140a is used to loosen the threaded pin 110a off of the axis shaft 28. Depending on whether the handlebar mount 26 is removed, a person (e.g., mechanic, rider, etc.) may adjust the preload on the upper and lower bearings 40, 36 by grasping the cylindrical portion 142 on flange 65 with his or her hand or inserting allen wrench 140 into hex recess 136 and turning the headset cap 44a as needed.

Figure 11:
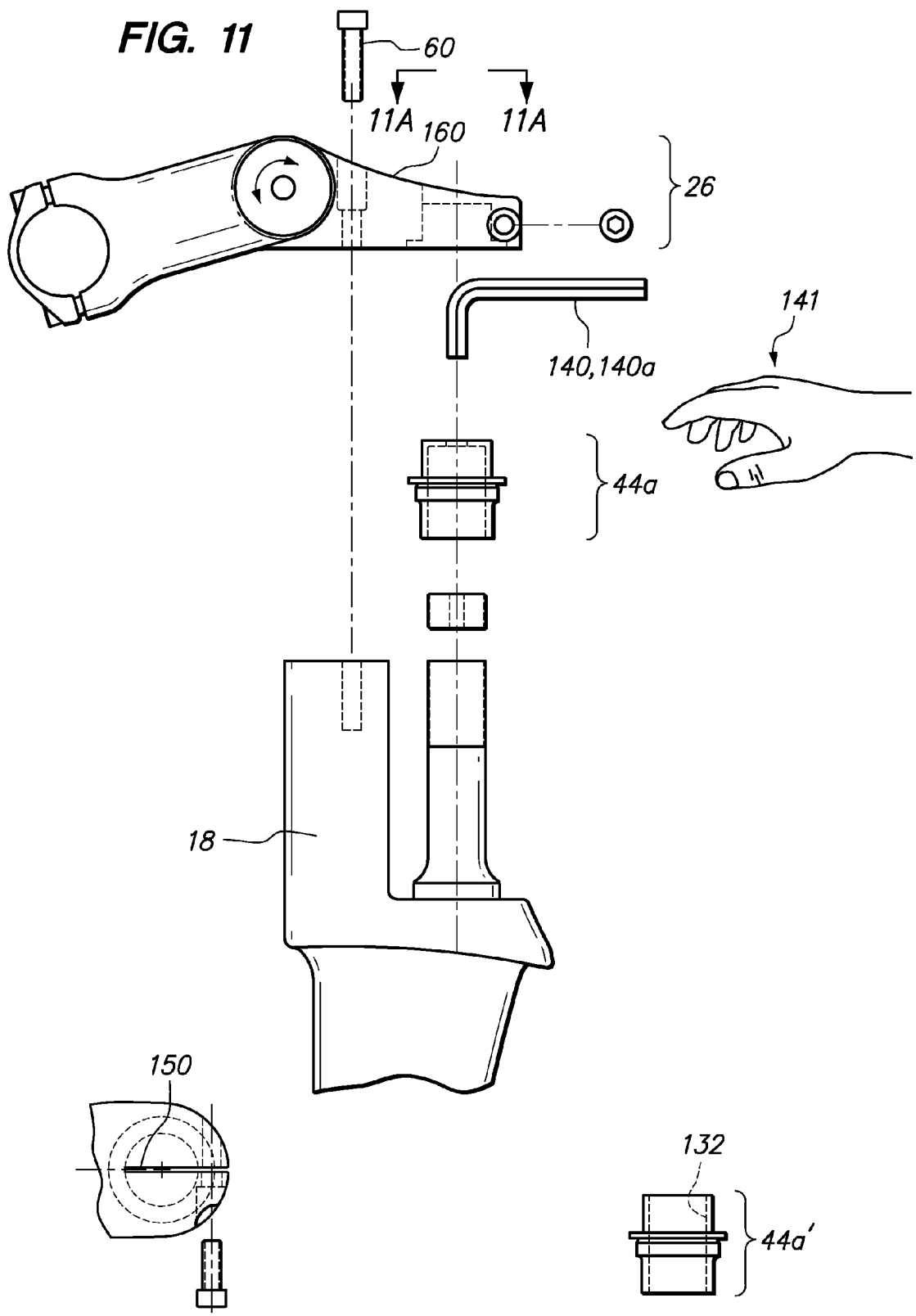
FIG. 11 illustrates a further alternate embodiment of locking a headset cap onto the axis shaft.

Referring now to FIG. 11, an alternate embodiment is shown. In this embodiment, the exterior surface 160 of the handlebar mount 26 does not have an aperture 158 (compare FIGS. 10B and 11A) to permit adjustment to the preload while the handlebar mount 26 is attached to the fork head 18 via the bolt 60. Rather, only the slot 150 is formed in the handlebar mount 26, as shown in FIG. 11A. The embodiment shown in FIG. 11 operates identical to the embodiment shown in FIG. 10. However, as can be seen in FIG. 11, the allen wrench 140, 140a is used prior to attachment of the handlebar mount 26 to the fork head 18. If the preload on the upper and lower bearings 40, 36 is adjusted by hand, then such adjustment is done prior to attachment of the handlebar mount 26 to the fork head 18. The aperture 158 is removed from the handlebar mount 26 to further reduce aerodynamic drag caused by various protuberances in the handlebar mount 26 area. In this embodiment, the preload on the upper and lower bearings 40, 36 are adjusted prior to the handlebar mount 26 being mounted to the fork head 18 with the bolt 60. As such, the allen wrench 140, 140a or hand 141 are shown disposed below the handlebar mount 26 in FIG. 11.

Figure 12:
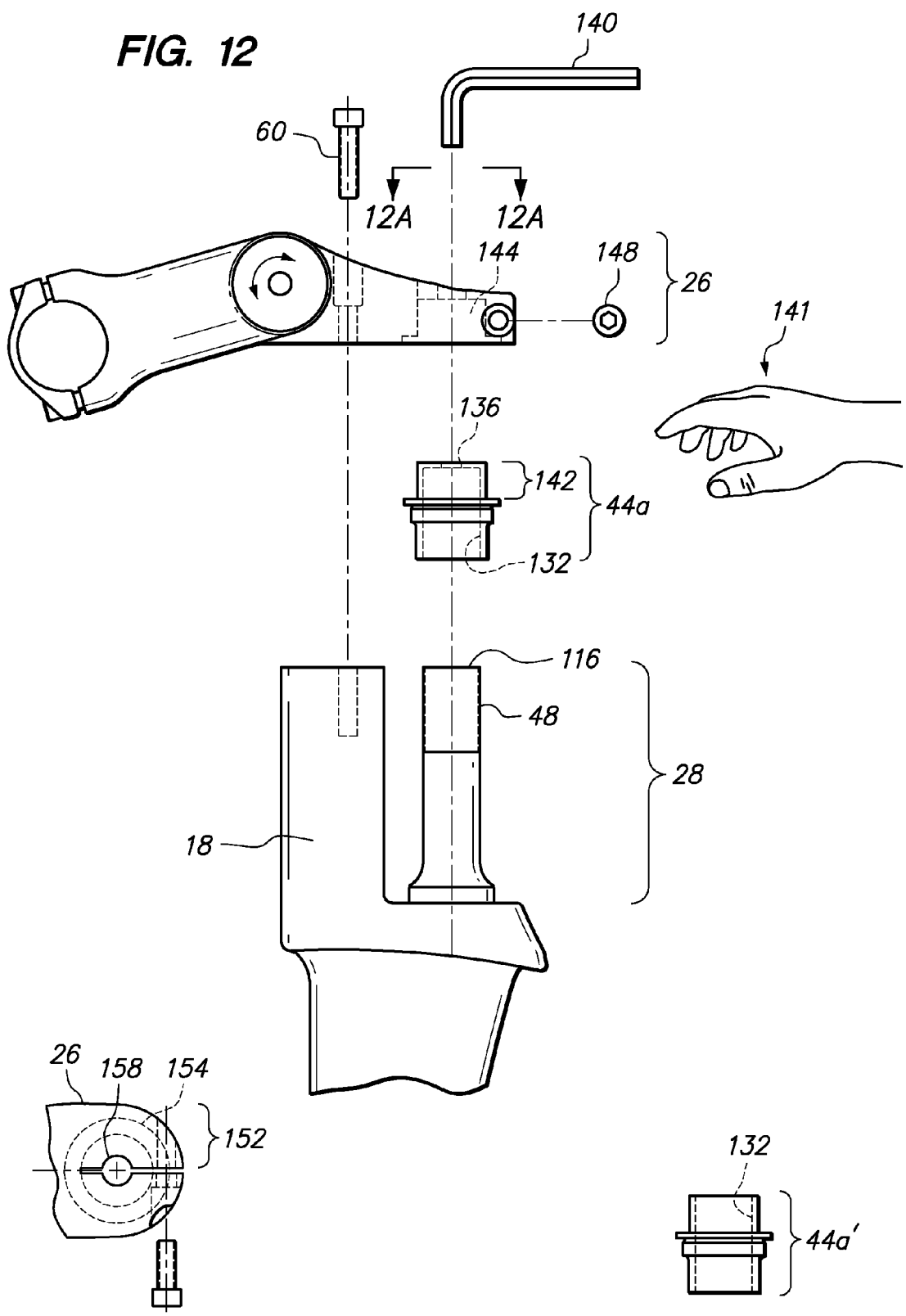
FIG. 12 illustrates a further embodiment of locking a headset cap onto the axis shaft.

Referring now to FIG. 12, an alternate embodiment is shown. The embodiment shown in FIG. 12 operates substantially similar to the embodiment shown in FIG. 10 except that the embodiment shown in FIG. 12 does not incorporate or utilize the threaded pin 110a. In the embodiment shown in FIG. 12, the headset cap 44a is used to apply a preload to the upper and lower bearings 40, 36. The headset cap 44a is adjusted by allen wrench 140 by engaging the allen wrench 140 to the hex recess 136 of the headset cap 44a. Alternatively, the headset cap 44a may be adjusted by hand. In this embodiment, a threaded pin 110a does not bear down on the top distal end 116 of the axis shaft 28 to prevent loosening of the preload or to take up any slack between the threads 132 of the headset cap 44a and the external threads 48 of the axis shaft 28. After the preload on the upper and lower bearings 40, 36 is applied by the headset cap 44a, the handlebar mount 26 is mounted to the fork head 18 with the bolt 60. The cylindrical portion 142 is received into the cylindrical recess 144. The bolt 148 is threaded onto the threaded through hole 154 of the first half 152 of the handlebar mount 26. This is shown in FIG. 12A. The frictional engagement between the inner surface of the cylindrical recess 144 and the cylindrical portion 142 prevents unwanted rotation of the headset cap 44a either due to vibration or other causes during use of the bicycle. In this embodiment, the allen wrench 140 may fit within the aperture 158 such that the preload may be adjusted after mounting the handlebar mount 26 to the fork head 18. More particularly, to adjust the preload after mounting the handlebar mount 26 to the fork head 18, the bolt 148 is loosened. The allen wrench 140 is inserted through the aperture 158 and engaged to the hex recess 136 of the headset cap 44a. The allen wrench 140 rotates the headset cap 44a to adjust the preload on the upper and lower bearings 40, 36. After the preload is adjusted, the bolt 148 is then retightened to lock the position of the headset cap 44a and fix the preload.

Referring now to FIG. 13, an alternate embodiment is shown. The embodiment shown in FIG. 13 may operate identical to the embodiment shown in FIG. 12 except that the headset cap 44b may be slotted as shown in FIG. 13A. The headset cap 44b may have a hex recess 136 and a slot 162 that extends from one side of the headset cap 44b and extends through the hex recess 136 and/or center of the headset cap 44b until the slot 162 reaches an inner surface or internal threads 132 of the headset cap 44b. The headset cap 44b may be flexed or compressed onto the external threads 48 of the axis shaft 28 to take up any play or slack between the threads 132 of the headset cap 44b and the external threads 48 of the axis shaft 28 which was discussed above.

During assembly, the headset cap 44b is threaded onto the axis shaft 28 by threadably engaging the internal threads 132 of the headset cap 44b and the external threads 48 of the axis shaft 28. The allen wrench 140 is received into the hex recess 136 of the headset cap 44a. Rotation of the allen wrench 140 adjusts the preload on the upper and lower bearings 40, 36. Alternatively, the preload on the upper and lower bearings 40, 36 may be made by hand 141. The headset cap 44b places preload on the upper and lower bearings until the fork is allowed to rotate but without any wobble. Thereafter, the handlebar mount 26 may be mounted to the fork head 18 via the bolt 60. The cylindrical portion 142 is received into the cylindrical recess 144. Thereafter, the bolt 148, as shown in FIG. 13B, is engaged with the threaded through hole 154 such that the internal surface of the cylindrical recess 144 is placed into frictional engagement with the external surface of the cylindrical portion 142. As the bolt 148 is further tightened, the first and second halves 152, 156 of the handlebar mount 26 is flexed inwardly and compressed upon the cylindrical portion 142. Since the headset cap 44b is slotted with slot 162, the headset cap 44b also flexes inwardly and compresses on the external threads 48. This takes up any play or slack between the threaded engagement of the internal threads 132 of the headset cap 44b and the external threads 48 of the axis shaft 28. As such, the tightening of the bolt 148 serves both to prevent unwanted rotation of the headset cap 44b such as due to vibration and also takes up any play or slack between the internal threads 132 of the headset cap 44b and the external threads 48 of the axis shaft 28. It is also contemplated that the embodiment shown in FIGS. 13-13B may eliminate the aperture 158 (see FIG. 13B) such that the preload adjustment must be accomplished or performed prior to the handlebar mount 26 being mounted to the fork head 18 via the bolt 60.

It is also contemplated that the hex recess 136, 138 discussed above may have a different configuration (e.g., star, etc.) to rotate either the headset cap 44a, b or the threaded pin 110a. Additionally, it is contemplated that the aperture 158 in relation to FIGS. 10-13B is optional. When the aperture 158 is not incorporated into the handlebar mount 26, the adjustments to the headset cap 44a, b and the threaded pin 110a must be done prior to attachment of the handlebar mount 26 to the fork head 18.

It is also contemplated that the threads 132 of the headset cap 44a', b' may extend through the entire headset cap 44a', b', as shown in FIGS. 10C, 11B, 12B, 13C and 13D. In this case, the hex recess 136 is not incorporated into the headset caps 44a', b'.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A bicycle comprising:
    a frame including a head steering end portion, the head steering end portion defining a central axis;
    a fork including fork legs joined at an upper portion defining a fork crown, the fork also including a fork head and axis shaft attached to the fork crown, the axis shaft defining a rotational axis of the fork, the lower portion of the axis shaft and a lower portion of the head steering end portion being sized and configured to receive a lower bearing, the fork head extending in front of the head steering end portion when the axis shaft is inserted into the head steering end portion;
    a headset cap being sized and configured together with the upper portion of the head steering end portion to receive an upper bearing, the headset cap being adjustably engageable to the axis shaft for preloading the upper and lower bearings for aligning the rotational axis of the fork to the central axis of the head steering end portion, the headset cap having an upper portion;
    a handlebar mount attachable to the fork head and a split aperture defining a recess, a cylindrical portion of the headset cap disposed within the recess when the handlebar mount is attached to the fork head, the split aperture having a loose configuration to allow the cylindrical portion to be inserted and removed from the recess of the split aperture and a pinched configuration wherein the split aperture is frictionally engaged to the cylindrical portion of the headset cap to prevent unwanted rotation of the headset cap during use of the bicycle.

2. The bicycle of claim 1 wherein the headset cap has a threaded hole and the bicycle further comprises a threaded pin threadably engageable with the threaded hole of the headset cap for cinching the threaded pin onto a top distal end of the axis shaft to prevent inadvertent rotation of the headset cap and take up play between the threaded hole of the headset cap and the axis shaft.

3. The bicycle of claim 1 wherein an upper portion of the axis shaft is threaded and engageable to the threaded through hole of the headset cap.

4. The bicycle of claim 1 wherein the upper portion of the headset cap is cylindrical and the recess of the handlebar mount is cylindrical.

5. The bicycle of claim 1 wherein the handlebar mount has an aperture for providing access to the headset cap to adjust preload while the handlebar mount is attached to the fork head.

6. The bicycle of claim 1 wherein the headset cap is split so the headset cap compresses onto the axis shaft to take up slack between the headset cap and the axis shaft when the split aperture is in the pinched configuration.

* * * * *